United States Patent
Gagliardi et al.

(10) Patent No.: US 8,200,810 B2
(45) Date of Patent: Jun. 12, 2012

(54) CONTENT DELIVERY NETWORK

(75) Inventors: Joshua D. Gagliardi, Lake Mary, FL (US); Timothy S. Munger, Phoeniz, AZ (US); Donald W. Ploesser, Reynoldsberg, OH (US)

(73) Assignee: Highwinds Holdings, Inc., Winter Park, FL (US)

( * ) Notice: Subject to any disclaimer, the term of this patent is extended or adjusted under 35 U.S.C. 154(b) by 175 days.

(21) Appl. No.: 12/334,426

(22) Filed: Dec. 12, 2008

(65) Prior Publication Data

US 2009/0157899 A1 Jun. 18, 2009

Related U.S. Application Data

(60) Provisional application No. 61/013,584, filed on Dec. 13, 2007, provisional application No. 61/014,682, filed on Dec. 18, 2007.

(51) Int. Cl.
*G06F 15/173* (2006.01)
*G06F 15/16* (2006.01)
*H04L 12/26* (2006.01)

(52) U.S. Cl. ........ 709/224; 709/223; 709/225; 709/226; 709/235; 370/229

(58) Field of Classification Search .......... 709/223–226, 709/235; 370/229
See application file for complete search history.

(56) References Cited

U.S. PATENT DOCUMENTS

| | | | |
|---|---|---|---|
| 6,108,703 A | 8/2000 | Leighton et al. | |
| 6,553,413 B1 | 4/2003 | Leighton et al. | |
| 6,671,715 B1 * | 12/2003 | Langseth et al. | 709/203 |
| 7,111,061 B2 | 9/2006 | Leighton et al. | |
| 7,113,993 B1 * | 9/2006 | Cappiello et al. | 709/227 |
| 7,149,797 B1 | 12/2006 | Weller et al. | |
| 7,181,523 B2 | 2/2007 | Sim | |
| 7,484,002 B2 | 1/2009 | Swildens et al. | |
| 7,502,994 B2 | 3/2009 | Kocol | |
| 7,543,224 B2 | 6/2009 | Schwartz | |
| 7,680,912 B1 * | 3/2010 | McNabb et al. | 709/223 |
| 2002/0065864 A1 | 5/2002 | Hartsell et al. | |
| 2002/0116494 A1 | 8/2002 | Kocol | |
| 2003/0014503 A1 | 1/2003 | Legout et al. | |
| 2003/0046396 A1 | 3/2003 | Richter et al. | |
| 2003/0236745 A1 | 12/2003 | Hartsell et al. | |
| 2004/0122943 A1 | 6/2004 | Error et al. | |

(Continued)

OTHER PUBLICATIONS

International Search Report and Written Opinion from PCT/US2010/045940 mailed Oct. 20, 2010.

(Continued)

*Primary Examiner* — Djenane Bayard
*Assistant Examiner* — Carlos Perez Toro
(74) *Attorney, Agent, or Firm* — Knobbe Martens Olson & Bear LLP

(57) ABSTRACT

A content delivery system for providing content from a content delivery network to end users may include a plurality of delivery servers that host one or more content items and an inventory server having an inventory of content. The inventory of content can indicate which of the delivery servers host the content items. The inventory server may receive a request for a content item from an end user system and may access the inventory of content to determine one or more delivery servers that host the content item. In response to this determination, the inventory server may redirect the request for the content item to a selected one of the delivery servers. The selected delivery server can then serve the content item to the end user system.

9 Claims, 12 Drawing Sheets

U.S. PATENT DOCUMENTS

| | | |
|---|---|---|
| 2004/0128346 A1 | 7/2004 | Melamed et al. |
| 2005/0108418 A1 | 5/2005 | Bedi et al. |
| 2005/0198250 A1 | 9/2005 | Wang |
| 2007/0118668 A1 | 5/2007 | McCarthy et al. |
| 2007/0168517 A1 | 7/2007 | Weller et al. |
| 2007/0204003 A1* | 8/2007 | Abramson .................... 709/217 |
| 2007/0209005 A1 | 9/2007 | Shaver et al. |
| 2007/0239609 A1 | 10/2007 | Fish et al. |
| 2007/0261072 A1 | 11/2007 | Boulet et al. |
| 2008/0065604 A1 | 3/2008 | Tiu et al. |
| 2008/0065759 A1 | 3/2008 | Gassewitz et al. |
| 2008/0086524 A1 | 4/2008 | Afergan et al. |
| 2008/0086574 A1 | 4/2008 | Raciborski et al. |
| 2008/0155061 A1 | 6/2008 | Afergan et al. |
| 2008/0184245 A1 | 7/2008 | St-Jean |
| 2008/0198752 A1 | 8/2008 | Fan et al. |
| 2008/0228891 A1 | 9/2008 | Cama |
| 2009/0070673 A1 | 3/2009 | Barkan et al. |
| 2009/0083788 A1 | 3/2009 | Russell et al. |
| 2009/0131152 A1 | 5/2009 | Busse |
| 2010/0131642 A1 | 5/2010 | Chalikouras et al. |
| 2010/0161729 A1 | 6/2010 | Leblanc et al. |
| 2010/0235494 A1 | 9/2010 | Sood et al. |

OTHER PUBLICATIONS

Josh Gagliardi, Usenet Training, May 5-7, 2004, Highwinds Software.

Josh Kuo, Google Analytics is Worth a Look, Jan. 27, 2007, InfoWorld.

Thomas Claburn, Google Analytics Adds Enterprises Features, Oct. 22, 2008, InformationWeek, CPM Media LLC.

Omniture Named a Web Analytics Leader by Independent Research Firm, Sep. 11, 2007, Market Wire, SYS-CON Media Inc.

International Search Report and Written Opinion mailed Apr. 7, 2009 regarding International Application No. PCT/US08/86721, in 15 pages.

Estan, C. et al., New Directions in Traffic Measurement and Accounting: Focusing on the Elephants, Ignoring the Mice, ACM Transactions on Computer Systems, vol. 21, No. 3, Aug. 2003, p. 270-313.

Henry, Mapping the Web: Clicky is Free, Real-Time Web Analytics, http://www.mappingtheweb.com/2007/02/05/clicky-is-free-real-time-web-analytics/, Feb. 5, 2007.

* cited by examiner

| File Path | Hits ▼ | Actual Transfer | Completion Ratio | Transfer Rate | Duration |
|---|---|---|---|---|---|
| picture.flv | 18,908 | 4.0 GB | 100.00% | 27.6 Mb/s | 23 m 31 s 979ms |
| router.flv | 18,520 | 5.2 GB | 100.00% | 29.2 Mb/s | 23 m 55 s 284ms |
| lizads.flv | 18,404 | 5.1 GB | 100.00% | 30.2 Mb/s | 22 m 39 s 814ms |
| paper.flv | 18,007 | 4.9 GB | 100.00% | 29.2 Mb/s | 22 m 34 s 670ms |
| whiskey.flv | 17,789 | 4.7 GB | 100.00% | 27.0 Mb/s | 22 m 54 s 950ms |
| trains.flv | 17,702 | 5.0 GB | 100.00% | 30.1 Mb/s | 22 m 6 s 356ms |

CONTENT DELIVERY NETWORK

RELATED APPLICATIONS

This application claims the benefit of priority under 35 U.S.C. §119(e) of U.S. Provisional Patent Application No. 61/013,584, filed on Dec. 13, 2007, and entitled "Hybrid NNTP Content Library Propagation and Delivery in a Content Delivery Network," and U.S. Provisional Patent Application No. 61/014,682, filed on Dec. 18, 2007, entitled "Apparatus for Real-Time Distributed Accounting of Managed Internet Services," the disclosures of which are hereby incorporated by reference in their entirety.

BACKGROUND

In a content delivery network (CDN), a content provider typically has a group of files or content library which they wish to make available for retrieval to a geographically distributed set of end users, typically by download or streaming protocols. A content delivery provider provisions these files to multiple computers or "edge nodes" over a network, such as the Internet, so that for many users there is a download or streaming location which can be physically closer to the users. The download or streaming location may also provide lower network latency or have higher capacity than the original location where the content provider's files are stored.

Rapid provisioning of these files to many locations is one problem faced by CDNs. Also, many CDNs are structured in a sparsely connected mesh, where several files to be provisioned on the edge nodes are first provisioned on one of a smaller number of servers. These servers may not be near the content library's original storage location.

SUMMARY

In certain embodiments, a content delivery system for providing content from a content delivery network to end users includes a plurality of delivery servers that host one or more content items and an inventory server having an inventory of content. The inventory of content can indicate which of the delivery servers host the content items. The inventory server may receive a request for a content item from an end user system and may access the inventory of content to determine one or more delivery servers that host the content item. In response to this determination, the inventory server may redirect the request for the content item to a selected one of the delivery servers. The selected delivery server can then serve the content item to the end user system.

In various embodiments, a system for cross-tabulating content usage information at multiple nodes of a content delivery network includes a plurality of delivery servers that each provide access to content. Each of the delivery servers may have one or more processors that can determine usage data that includes information corresponding to delivery of content from the delivery server. The content may be hosted by the delivery servers on behalf of one or more content providers that each have an account with an operator of the content delivery network. Each of the delivery servers may also batch at least a portion of the usage data to produce first batched usage data, where the first batched usage data may include a summary of the usage data. In addition, each of the delivery servers may also provide the first batched usage data to a usage server.

In certain embodiments, a computer-implemented method of providing content to end users from a content delivery network having one or more delivery servers each having computer hardware and an inventory server having computer hardware includes receiving, with a content delivery network, a content item from a content provider, where the content provider provides a web site. The method may also include returning a uniform resource indicator (URI) corresponding to the content item, where the URI can identify the inventory server in the content delivery network. The method may also include provisioning the content item to the one or more delivery servers in the content delivery network, where the one or more delivery servers each comprising computer hardware. In response to the one or more delivery servers receiving the content item, the method may also include providing to the inventory server a message from each of the one or more delivery servers that have received the content item, where the message reflects the receiving of the content item by the one or more delivery servers. The method may also include storing inventory information in an inventory of the inventory server, where the inventory information describes which of the one or more delivery servers hosts the content item. The method may also include receiving, with the inventory server, a request for the content item from an end user, where the request specifies the URI, and where the end user having received the URI in response to accessing the web site of the content provider. The method may also include accessing the inventory to determine a selected delivery server that hosts the content item. The method may also include redirecting the request for the content item to the selected delivery server and providing the content item to the end user from the selected delivery server.

In certain embodiments, a computer-implemented method of provisioning content in a content delivery network includes provisioning a content item to first delivery servers selected from a plurality of delivery servers, where each of the plurality of delivery servers has computer hardware. In response to a selected one of the first delivery servers receiving the content item, the method may further include providing to an inventory server an inventory message from the selected delivery server, where the inventory message reflects the receiving of the content item by the selected delivery server. The method may further include storing, with the inventory server, an inventory in physical computer storage, where the inventory indicates which of the delivery servers hosts the content item.

In certain embodiments, a content delivery system for providing content from a content delivery network to end users includes a plurality of delivery servers in a content delivery network, where the delivery servers have computer hardware. At least some of the delivery servers may host one or more content items. The system may further include an inventory server that includes an inventory of content, where the inventory of content indicates which of the delivery servers host the one or more content items. The inventory server can receive a request for a content item, where the request specifies a logical location of the content item, use the logical location of the content item to access the inventory of content to determine one or more delivery servers that host the content item, and redirect the request for the content item to a selected one of the delivery servers, such that the selected delivery server is operative to serve the content item.

In certain embodiments, a system for provisioning content in a content delivery network includes a content delivery network having a plurality of delivery servers, where each of the delivery servers has computer hardware. The system may further include one or more propagation servers that can provision a content item to first delivery servers selected from the plurality of delivery servers. Each of the first delivery servers can provide to a server a message reflecting the receiving of the content item by the first delivery server, in response to the first delivery server receiving the content item. The server may store an inventory in physical computer storage, where the inventory indicates which of the delivery servers hosts the content item.

In certain embodiments, a system for providing media owners with media delivery reports showing statistics of each media file delivered includes a plurality of delivery servers in a content delivery network, where each of the delivery servers delivers media files to users over the Internet, and where the media files may be owned by a plurality of different media owners. Each of the delivery servers can be programmed to: log the time, date, file size in bytes, delivered bytes in case of partial delivery, and delivery duration of each media file delivered to the user over the internet, for each event when a media file is delivered to a user, analyze the log events to generate an event report for each media file including the number of deliveries of any portion of each media file according to the time of day and date, and the total number of bytes of each media file delivered, and provide event reports to a usage server. The usage server can be programmed to: receive the event reports from each of the delivery servers, combine the event reports from each of the delivery servers into combined event reports, such that the amount of each media file delivered by the plurality of delivery servers is summed to reflect a cumulative total amount of each media file delivered by the plurality of delivery servers, and provide the combined event reports to a billing server. The billing server can be programmed to: combine the combined event reports with historical log event data stored in a provider database to produce overall delivery statistics, calculate a delivery completion percentage for each media file by dividing the total amount of bytes of each media file delivered by the size of the respective media file; and output a content user interface for display to each of the content owners, the content user interface. The content user interface can display the delivery completion percentage for each media file, so that each media owner can determine which of the media files are being completely delivered to end users as well as the respective average proportions of the media files that are only partially delivered to users, thereby enabling the media owners to determine which of the media files are more often viewed in their entirety by users and which are only partially viewed by the users.

In certain embodiments, a system for cross-tabulating content usage information at multiple nodes of a content delivery network architecture includes: a plurality of delivery servers in a content delivery network, where each of the delivery servers can provide access to content. Each of the delivery servers can include one or more processors that can: determine usage data, where the usage data includes information corresponding to delivery of content from the delivery server, and where the content is hosted by the delivery servers on behalf of one or more content providers, and where each of the one or more content providers has an account with an operator of the content delivery network. Each of the delivery servers may also batch at least a portion of the usage data to produce first batched usage data, where the first batched usage data includes a summary of the usage data, and provide the first batched usage data to a usage server. The usage server can receive the first batched usage data from each of the delivery servers, batch the first batched usage data from each of the delivery servers into second batched usage data, and provide the second batched usage data to a billing server. The billing server can cross-tabulate the second batched usage data with usage data stored in a provider database to produce overall usage data.

In certain embodiments, a system for tracking content deliveries in a content delivery network includes a plurality of delivery servers in a content delivery network, where the delivery servers have computer hardware. Each of the delivery servers can: track delivery data corresponding to content deliveries performed by the delivery server, cross-tabulate the delivery data to produce condensed delivery data, and provide the condensed delivery data to a usage server. The usage server can cross-tabulate the condensed delivery data received from each of the delivery servers to produce second condensed delivery data.

In certain embodiments, a method for tracking content delivery information in a content delivery network includes receiving, with a first usage server having one or more processors, first delivery data corresponding to first content deliveries performed by a first delivery server, where the first delivery data has information about deliveries of content by the first delivery server. The method may further include receiving, with the first usage server, second delivery data corresponding to second content deliveries performed by a second delivery server. The method may further include combining, using the one or more processors of the first usage server, the first and second delivery data received from the first and second delivery servers to produce first summarized delivery data. The method may further include providing the first summarized delivery data to a billing server, where the billing server can combine the first summarized delivery data with second summarized delivery data received from a second usage server to produce combined delivery data and can store the combined delivery data in a provider database comprising physical computer storage.

The usage server can receive the first batched usage data from each of the delivery servers, batch the first batched usage data from each of the delivery servers into second batched usage data, and provide the second batched usage data to a billing server. The billing server can cross-tabulate the second batched usage data with usage data stored in a provider database to produce overall usage data.

For purposes of summarizing the disclosure, certain aspects, advantages and novel features of the inventions have been described herein. It is to be understood that not necessarily all such advantages may be achieved in accordance with any particular embodiment of the inventions disclosed herein. Thus, the inventions disclosed herein may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers may be reused to indicate correspondence between referenced elements. The drawings are provided to illustrate embodiments of the inventions described herein and not to limit the scope thereof.

FIGS. 9 through 12 illustrate example administrative displays for viewing usage data related to the content delivery network.

DETAILED DESCRIPTION

In addition to the disadvantages of typical CDNs described above, many CDNs have little or no knowledge of which files are provisioned on which servers in the network. As a result, a CDN might replicate all files on most or all edge nodes of the network, to attempt to ensure that a user directed to an edge node will find a desired file. If the user is directed to an edge node that does not have the desired file, the edge node may request the file from another node in the sparsely-connected mesh. This request can introduce delays in responding to the user's request.

This disclosure describes certain systems and methods for enhanced content delivery in a CDN. In certain embodiments, a CDN includes delivery servers that host content items. When a delivery server is provisioned with a content item, the delivery server can inform an inventory server about the provisioning of the content item. The inventory server can store a mapping between the delivery server and the content item in an inventory. Then, an end user system that accesses a web page specifying the content item can be directed to the inventory server. Because the inventory server knows, in certain embodiments, the location of the content item, the inventory server can redirect the end user system to the proper delivery server.

The CDN may also include a usage tracking system that streamlines the tracking of content usage. In certain embodiments, delivery servers send log messages that include usage data to usage servers. The usage servers may cross-tabulate the log messages received from the delivery servers. The usage servers can then provide log messages to a billing server, which can accumulate the usage data in a provider database. Advantageously, in certain embodiments, the usage tracking system can streamline the reporting and tabulating of usage data and thereby enable the CDN to provide content providers with access to recent usage data.

FIGS. 1-5 describe content delivery features of the CDN. FIGS. 6-12 describe various usage tracking features of the CDN.

I. Content Delivery Features

Figure 1:
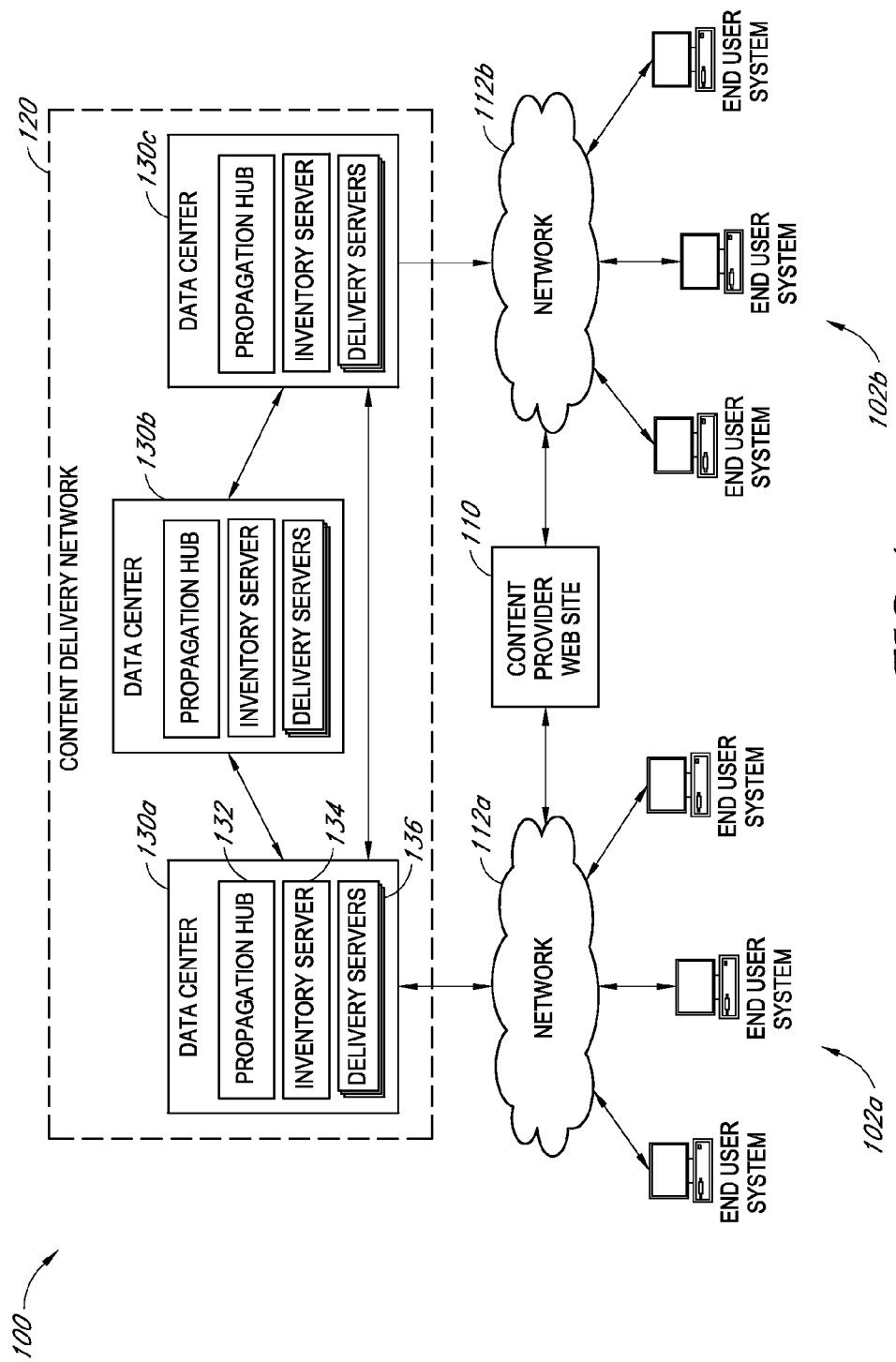
FIG. 1 illustrates an embodiment of a network environment for providing content to end users.

Referring to FIG. 1, an embodiment of a network environment 100 is shown for providing users with access to content. The network environment 100 includes a content delivery network (CDN) 120. In certain embodiments, the CDN 120 includes inventory information about the location of content in the CDN 120. This inventory information advantageously enables the CDN 120, in certain implementations, to more efficiently use computing resources and bandwidth. As a result, the CDN 120 may be able to provide better service to users than certain other CDNs.

The CDN 120 may host content that is associated with a web site 110 of a content provider. The content may include various types of media, such as music, videos, and images. The content provider may employ the services of the CDN 120 to more efficiently distribute the content associated with the web site 110 to end user systems 102. Users that access the content provider web site 110 over a network 112 such as the Internet may, for example, receive a base web page from the web site 110. The users can access content items or objects referenced in the web page from the CDN 120.

The content provider web site 110 may include one or more physical computing devices, such as servers. Likewise, the end user systems 102 may include various types of computing devices, such as, for example, desktop computers, workstations, web pads, personal digital assistants (PDAs), mobile phones, set-top television boxes, media players, laptop computers, tablets, combinations of the same and the like. The end user systems 102 can also include various software applications for accessing the web site 110 and the content of the CDN 120, such as browser software applications, stand-alone software applications, plug-ins, media players, interfaces, combinations of the same, and the like.

The CDN 120 of the depicted embodiment includes a plurality of data centers 130. Each data center 130 may be located in a different geographical area from the other data centers 130, to increase the number of end users that are physically close to a data center 130. As a simplified example, a first data center 130a may be accessed by end-user systems 102a in one location through the network 112a, and a second data center 130c in another location may be accessed by other end user systems 102b. Three data centers 130 are depicted for ease of illustration; more or fewer data centers 130 may be provided in various implementations. In addition, end user systems 102 may access more remote data centers 130, for example, if latency of those data centers 130 is less than latency of more proximate data centers 130.

In certain embodiments, each data center 130 includes a propagation hub 132, an inventory server 134, and one or more delivery servers 136, each of which may include one or more physical computing devices. However, this grouping of servers in one data center 130 is merely illustrative. The propagation hub 132 may be a server that provisions content received from a content provider to the delivery servers 136. The propagation hub 132 may also provide or propagate content to other propagation hubs 132 of other data centers 130. In the depicted embodiment, arrows connecting the data centers 130 indicate that each data center 130 may communicate with each other. For example, the propagation hub 132 of one data center 130 may communicate with the propagation hubs 132 of each other data center 130.

Because each propagation hub 132 may talk with every other propagation hub 132 in the depicted embodiment, the propagation hubs 132 are in a fully-connected or substantially fully-connected mesh configuration or topology. Advantageously, certain embodiments of the CDN 120 are therefore not constrained to the rigid hierarchical tree topologies of other CDNs. As will be described in greater detail below with respect to FIGS. 2 and 3, the fully-connected mesh structure of the CDN 120 can enable more efficient propagation of content and other data through the CDN 120. In addition, the mesh topology of the CDN 120 can make the CDN 120 more robust in the face of network failures and congestion.

The fully-connected mesh topology shown in FIG. 1 is merely an illustrative topology for the CDN 120. In other embodiments, the CDN 120 may have an arbitrary topology, for example, a topology with a portion of all propagation hubs 130 in communication with each other, a hierarchical or partially hierarchical topology, combinations of the same, and the like.

The delivery servers 136 can receive the content from the propagation hubs 132 and host or otherwise store the content. Upon receiving the content from the propagation hubs 132, the delivery servers 136 may report content location information to the inventory server 134. The inventory server 134 can in turn store an inventory of the content locations. This inventory may include one or more data structures that map content items to delivery servers 136 and/or content items to specific directories on delivery servers 136. In some implementations, inventory servers 134 also report their inventory to other inventory servers 134 through the propagation hubs 132. As a result, each inventory server 134 may have an inventory reflecting the contents of all or substantially all of the delivery servers 136 in the CDN 120. The inventory servers 134 may each store the entire inventory in volatile storage (e.g., memory), to improve inventory performance.

In operation, the content provider may upload a content item to the CDN 120, which may be received by one of the propagation hubs 132. The CDN 120 may provide the content provider with a network address for the content item (see FIG. 2). The content provider may then embed the network address in one or more pages or documents of the content provider web site 110. The propagation hub 132 may provide the content item to one or more delivery servers 136, which in turn may report the receipt of the content item to one or more inventory servers 134.

An end user system 102 accessing the content provider web site 110 may be directed to the network address to retrieve the content item. Advantageously, in certain embodiments, the network address is an address of one of the inventory servers 134. Thus, the end user system 102 can request the content item from the inventory server 134. In response, the inventory server 134 may access its inventory to determine which of the delivery servers 136 has the content item. The inventory server 134 may select a delivery server 136 that may be optimal for the end user based at least in part on geographical proximity, network congestion, and/or other network conditions.

The inventory server 134 may provide a network address of one of the delivery servers 136 to the end user system 102. The end user system 102 may then access the content item from the delivery server 136. Advantageously, because the inventory servers 134 have information regarding content item location on delivery servers 136, fewer than all of the delivery servers 136 may be used to store any one content item.

In contrast, other CDNs may not have inventory knowledge of delivery servers. As a result, these CDNs typically provision most or all delivery servers with each content item. As a result, storage space can be wasted on the delivery servers of other systems. In addition, other CDNs often provide content providers with network addresses for delivery servers, which the content providers can embed in their web sites. An end user accessing a content provider web site may then be redirected to a specific delivery server to access the content item. However, because these CDNs do not have content inventory, the network address may point to a delivery server that does not have the content item. The delivery server may then have to obtain the content item from another server in the CDN hierarchy. This cache-on-demand architecture can result in delays to the user.

Certain embodiments of the CDN 120 can use delivery server 136 storage space more efficiently and can have fewer delays than certain cache-on-demand CDN systems. Moreover, because the CDN 120 may use storage space more efficiently, the delivery servers 136 may require little or no cache management, other than that provided natively by an operating system on each server 136. In contrast, in other CDN systems, significant software overhead may be used to manage caches, for example, to ensure that popular items do not dominate a cache and thereby leave little cache space for less popular items.

In alternative embodiments, fewer than all of the data centers 130 may have inventory servers 134. One inventory server 134 may be used for the entire CDN 120, or a plurality of inventory servers 134 may be spread amongst various data centers 130. Likewise, although the propagation hub 132, inventory server 134, and delivery servers 136 are shown grouped together in one geographic location (e.g., the data center 130a), these servers may be located in separate, geographically different locations or in different data centers 130.

In addition, the inventory of the inventory servers 134 may be installed on certain of the delivery servers 236 or other servers, such that no separate server is used for inventory storage. However, it may be advantageous, but not necessary, to use the inventory servers 134 only for storing inventory and redirecting requests to delivery servers 134 to improve the performance of the inventory servers 134.

Figure 2:
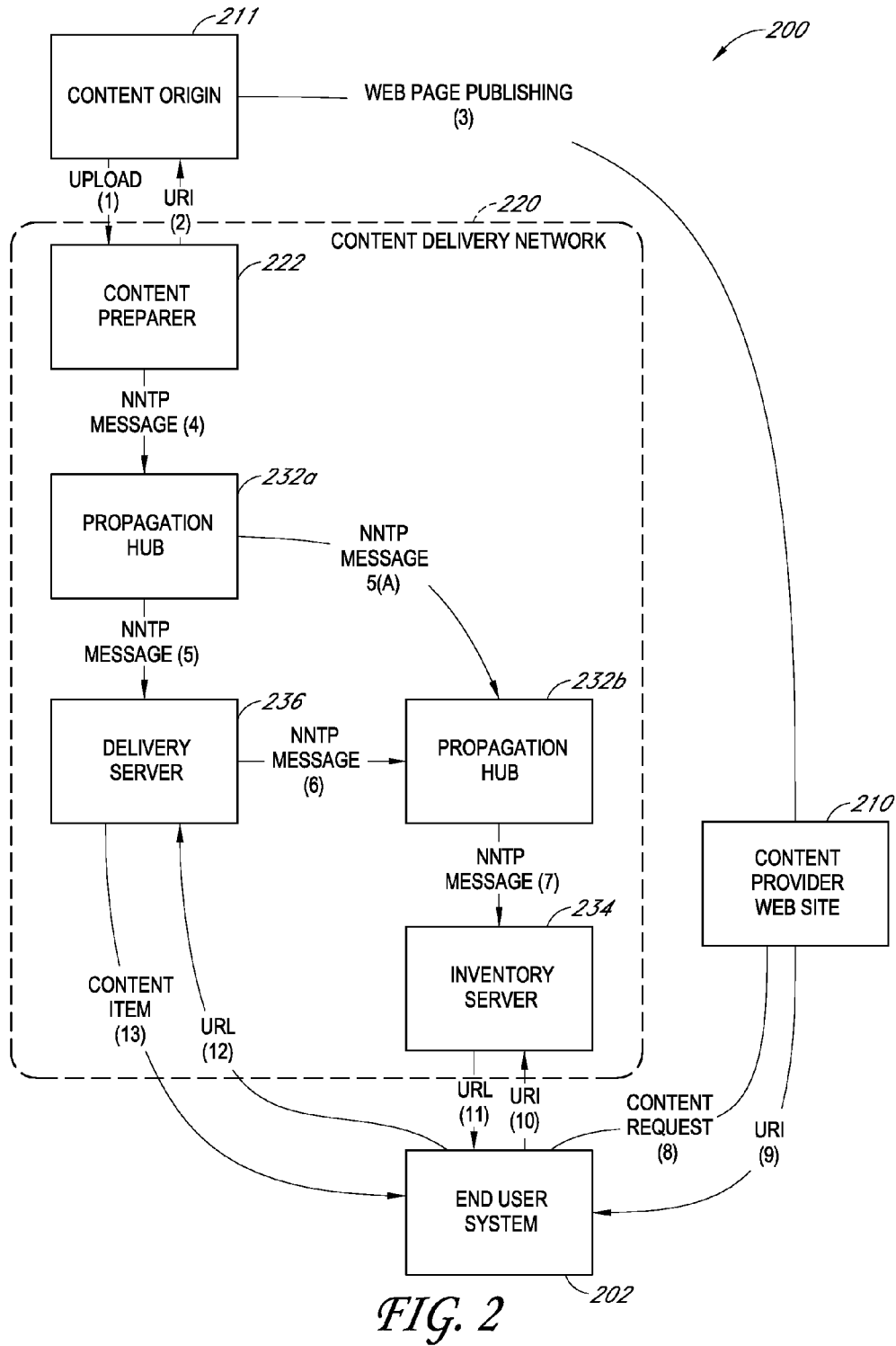
FIG. 2 illustrates an embodiment of a process flow for providing content from a content delivery network to an end user.

FIG. 2 illustrates an embodiment of a content process flow 200 for an example CDN 220. The CDN 220 may include all the features of the CDN 120 described above. For instance, the CDN 220 includes propagation hubs 232a, 232b, a delivery server 236, and an inventory server 234. The CDN 220 also includes a content preparer 222. The process flow 200 illustrates the provisioning of one or more content items to the CDN 220 and the retrieval of the one or more content items by an end user system 202. The CDN 220 is shown with a simplified number of servers for ease of illustration; however, many other servers may be included in the CDN 220 in certain implementations.

A content origin server 211 is shown that may include one or more computing devices. The content origin server 211 may be a file server or media company content management system, where a content provider has stored a content library of content items (e.g., digital files). These files may be numerous and large, for example thousands or more files each up to several gigabytes or more in size. The content origin server 211 may be owned or operated by the content provider.

In the depicted embodiment, at state 1 the content origin server 211 uploads one or more content files from the content library to the content preparer 222 of the CDN 220. The content origin server 211 may upload the files via FTP, HTTP, NNTP, or another protocol. The content preparer 222 may be a server comprising computer hardware and/or software, an application on another server (such as a propagation hub 232), or the like. In response to receiving each file, at state 2 the content preparer 222 returns a network address for the file to the content origin server 211. The network address may be a uniform resource indicator, or URI. A "URI," in addition to having its ordinary meaning, can be a resource identifier that includes a network address which is semi-independent from the location where that resource is stored. An example URI is described below with respect to FIG. 4.

If a content file is designated for download delivery, then the returned URI may refer to the file itself. If the content is designated for streaming media delivery, then the URI may refer to a playlist file that may have a name derived from the content file. Playlists may be XML documents or the like that provide a series of media resources to play a content item. Playlists may permit multiple delivery servers 236 to stream the series of media resources.

At state 3, the content provider may publish a web page or other network application to a content provider web site 210 that identifies one or more content items by the URI(s) received from the content preparer 222. The web page or other network application may include references to the URI(s) directly or to application code which calls another server to find out the URI(s).

The content preparer 222 can, at state 4, provide a message containing at least a portion of the file to a propagation hub 232a. In certain embodiments, the content preparer 222 repackages the uploaded content library for propagation by splitting large content files into smaller pieces, and packaging those pieces into messages. In certain embodiments, the content preparer 222 packages the file pieces into Network News Transfer Protocol (NNTP) messages. Each NNTP message may include a series of bytes formatted according to Request For Comments (RFC) 822, 977, 3977, and the like. The message may include a string of bytes with a header area having keys and values, and a body area containing arbitrary content. Some fields in the message might include a Message-Id field, which can uniquely identify a message; a Newsgroups field, which can indicate one or more NNTP families of messages to which a message belongs; a From field, which can identify the message author (e.g., a server name); and a Subject field, which may give a short string describing the message.

For example, the content preparer 222 may split a 100 megabyte content file into ten 10-megabyte files. The content preparer 222 may label each piece of the file with specific propagation instructions in an NNTP message header or in the beginning of an NNTP message body. The content preparer 222 may insert a string representing the original filename and possibly an original path location for the file in the Message-ID field. The content preparer 222 can provide the NNTP message to a propagation hub 232a by posting the message to one or more NNTP newsgroups through appropriate use of the Newsgroups NNTP field. In an embodiment, the content preparer 222 uses the Newsgroups field to identify a channel or channels to which the delivery server 236 subscribes.

The propagation hub 232a can run an application which manages the propagation of NNTP messages. In response to receiving messages from the content preparer 222, the propagation hub 232a can offer each message at state 5A to any other propagation hub (e.g., the propagation hub 232b) not known to already have the message. In certain embodiments, the propagation hub 232a provides the message to propagation hubs 232 which indicate willingness to accept the message. The propagation hubs 232 may indicate this willingness by subscribing to one or more channels. The propagation hub 232a may also provide the message at state 5B to one or more delivery servers 236, e.g., delivery servers 236 that are in a same data center as the propagation hub 232a.

In certain embodiments, the propagation hubs 232 can differ from NNTP message routers in that they can detect and take action based on the specially-formatted NNTP Message-Ids set by the content preparer 222 as well as propagation instructions contained in the packaging of the file parts in the NNTP messages. Depending on the configuration of the propagation hub 232a and propagation instructions in the messages, a message might be sent to other propagation hubs 232, to all delivery servers 236, to a subset of delivery 236 servers, or to a combination of the above. In one embodiment, a message is sent to all other propagation hubs 232 and a portion of the delivery servers 236 in the same location or data center as the propagation hub 332a.

Each propagation hub 232 can open multiple channels to the other servers to which it is connected. Messages therefore can travel in parallel from one server to another. Consequently, in one embodiment, the propagation hub 232 may transfer one very large file to another delivery server 236 or propagation hub 232 in less time compared with one large serial transfer because messages containing portions of the file can all travel at the same or substantially the same time. This effect can be particularly pronounced when multiple propagation hub 232 hops are used to send a message from one end of the CDN 220 to another.

In some implementations, a plurality of propagation hubs 232 can act like a bus architecture, where messages posted to one propagation hub 232 are delivered to other propagation hubs 232 that are listening for those messages. Each message may therefore be addressed to a set of channels, which may define which geographical regions those messages are sent to. Similarly, each propagation hub 232 may subscribe to one or more of those channels. A propagation hub 232 that is subscribed to a channel for one geographical region might therefore receive all messages directed to that region. A master channel may also be provide that allows messages to be sent to all propagation hubs 232, regardless of which regions the propagation hubs 232 are individually subscribed to.

The propagation hub 232 can also propagate other types of messages between different servers, including inventory announcements from delivery servers 236 indicating which files are available to provide to end-users. Inventory announcements are described below. Another type of message the propagation hub 232 may propagate indicates an operation to be taken on the delivery servers 236, such as deleting or renaming a file. Advantageously, in certain embodiments, because the inventory servers 234 know the location of all or substantially all the files in the CDN 220, the propagation hubs 232 can propagate deletion, renaming, and other file operations quickly through the CDN 220.

Propagation hubs 232 can be stackable: for operational stability and as the amount of traffic grows, a propagation hub 232 may be split into several propagation hub applications, each responsible for a subset of the hosts (e.g., delivery servers 236 and inventory servers 234) or traffic for which the previous propagation hub 232 was responsible. For instance, a propagation hub 232 can be split such that one propagation hub 232 communicates with remote propagation hubs 232, while another propagation hub 232 communicates with a group of delivery servers 236. Alternately, a propagation hub 232 processing inventory and file propagation traffic might be split into two propagation hubs 232, one processing inventory and the other processing file propagation.

Additionally, proper configuration of the content preparer 222 and the propagation hubs 232 may permit charging customers of the CDN 220 (e.g., content providers) for different levels of propagation. For example, different billing can be provided for propagation to delivery servers 236 in a subset of geographic locations, or redundant propagation to certain delivery servers 236, including possibly every delivery server 236, in several or all locations.

The delivery server 236 can receive NNTP messages from the propagation hub 232a and manage the re-assembly of pieces of files into the original form in which they existed on the content origin 211. Because of the parallel propagation of the file portions in certain embodiments, messages containing portions of files may arrive out of order. The delivery server 236, in one implementation, can manage the file portions separately until sufficient portions are present to re-assemble them, when the delivery server 236 may reconstitute a file in its original form.

The delivery server 236 may re-organize files into the same or different directory structure from that in which the files existed on the content origin 211. One delivery server 236 can manage files for many different customers. The delivery server 236 may be able to serve files to end-users directly via HTTP, FTP, or other download protocol. If download delivery is not desired, for example in order to prevent users from saving copies of content, the delivery server 236 can provide tighter-controlled delivery of the re-assembled files to end users via a media-streaming protocol like the Real Time Messaging Protocol (RTMP) or the Real Time Streaming Protocol (RTSP).

When file re-assembly is complete or substantially complete, at state 6 the delivery server 236 can send an NNTP inventory message to one or more propagation hubs (e.g., the propagation hub 232*b*) announcing the newly available file. The propagation hub 232*b* can send these inventory messages on to the inventory server 234 at state 7. In addition, the propagation hub 232*b* can send the inventory messages to other propagation hubs 232, which may provide the inventory messages to other inventory servers 234.

At state 8, an end user system 202 requests content from the content provider web site 210. The content provider web site 210 may return a base web page and one or more URIs for content items hosted by the CDN 220 at state 9. The end user system 202 can then use each URI to access the content. At state 10, each URI directs the end user system 202 to an inventory server 234. Each URI may direct the user to a possibly different inventory server 234. In response to receiving the URI, each inventory server 234 can use the URI to consult an internal inventory to find a delivery server 236 where the content item can be downloaded from, or a list of one or more delivery servers 236 from which the content item can be streamed. Any inventory server 234 in the CDN 220 can be contacted by an end user system 202 and provide an acceptable reply.

At state 11, for a given URI, the inventory server 234 redirects the end user system 202 to a delivery server 236, e.g., by returning a uniform resource locator (URL) or IP address to the end user system 202. For HTTP delivery, for example, the inventory server 234 can generate HTTP redirect messages giving the URL or IP address of a delivery server 236 known to host the file and suspected to be near the end user system 202. In another embodiment, the inventory server 234 redirect in the TCP layer by sending a raw internet protocol (IP) datagram to the delivery server 236, tearing down the connection between the end user system 202 and the inventory server 234, and silently creating a new connection between the end user system 202 and the delivery server 236. In still other embodiments, the inventory server 234 can redirect by using direct server return techniques (DSR). The end user system 202 can access the delivery server 236 using the URL (or IP address) at state 12. In response, the delivery server 236 can provide the content item to the end user system 202 at state 13.

Because the inventory server 234 can have explicit knowledge of the inventory of the delivery servers 236, content delivery time can be reduced compared with existing cache-on-demand systems where the delivery server may be asked to serve content which it in turn has to request from another host. In addition, the content preparer 222 described above may designate channels for the propagation messages that refer to different delivery servers 236. The content preparer 222 may use a load balancing algorithm to cycle through different delivery servers 236, so as to perform load balancing on the delivery servers 236.

In addition, the CDN 220 may provide other advantages in certain embodiments. For example, when content propagation is easy (e.g., there is little network congestion), it may be possible to serve as a hot backup for other CDNs on short notice. The inventory servers 234 may be provided with the URLs of another CDN's content, for instance. In response, the inventory servers 234 can provide the other CDN with URI's to embed in the web pages or network applications of its customers. As a result, the CDN 220 can rapidly act as a backup for other CDNs. Another potential advantage in some implementations is that if content rises rapidly in popularity, the CDN 220 may be able to push the content to many delivery servers 236 quickly, on short notice, and without changing URIs for the content. This advantage can provide good response times for content delivery when demand is high.

Another advantage provided in certain embodiments is that the various roles of servers in the CDN 220 are segregated to allow for scalability. In certain embodiments, the propagation hubs 232 permit horizontal scalability, which can include the ability to provision additional small delivery servers 236 rather than replace small delivery servers 236 with large ones. The clean segregation of roles can reduce the cost of individual servers in the CDN 220 by reducing each server's hardware requirements, as compared with a solution where the roles of servers are less clear. For instance, the inventory servers 234 may have a significant portion of memory or RAM, a relatively lower capacity CPU, and relatively small hard disk space. Delivery servers 236 may have a large portion of memory or RAM, a relatively lower capacity CPU, and a relatively large, possibly slow hard disk.

Role segregation may also help vertical segregation, which can include the ability to host more traffic per server, by permitting the operating system of each server to focus on one type of work. Role segregation can also provide business scalability by permitting the scaling of one server's role based on shifting business demands. For instance, if content file sizes increase, the disk drives in the delivery servers 236 can be made larger without purchasing additional inventory servers. Conversely, if the average hit rate increases, the number of inventory servers 234 can be increased, without expanding delivery servers' 236 size or capacity. Other content delivery networks with less clear roles may require expansion of all components to expand the capacity in a single component.

In certain embodiments, this load balancing does not take into account the location of the end user systems 202. Rather, an inventory server 234 contacted by the end user system 202 directs the user to a delivery server that may be close to the end user system 202. Thus, the URI might direct the end user system 202 to a remote inventory server 234, which in turn redirects the end user system 202 to a closer delivery server 236.

Although the embodiments shown are described primarily in the context of NNTP messages, other push-based network protocols may be used to provision servers with content and inventory. For instance, IBM MQ Series protocols or a Teradata architecture may be used in place of NNTP.

Figure 3:
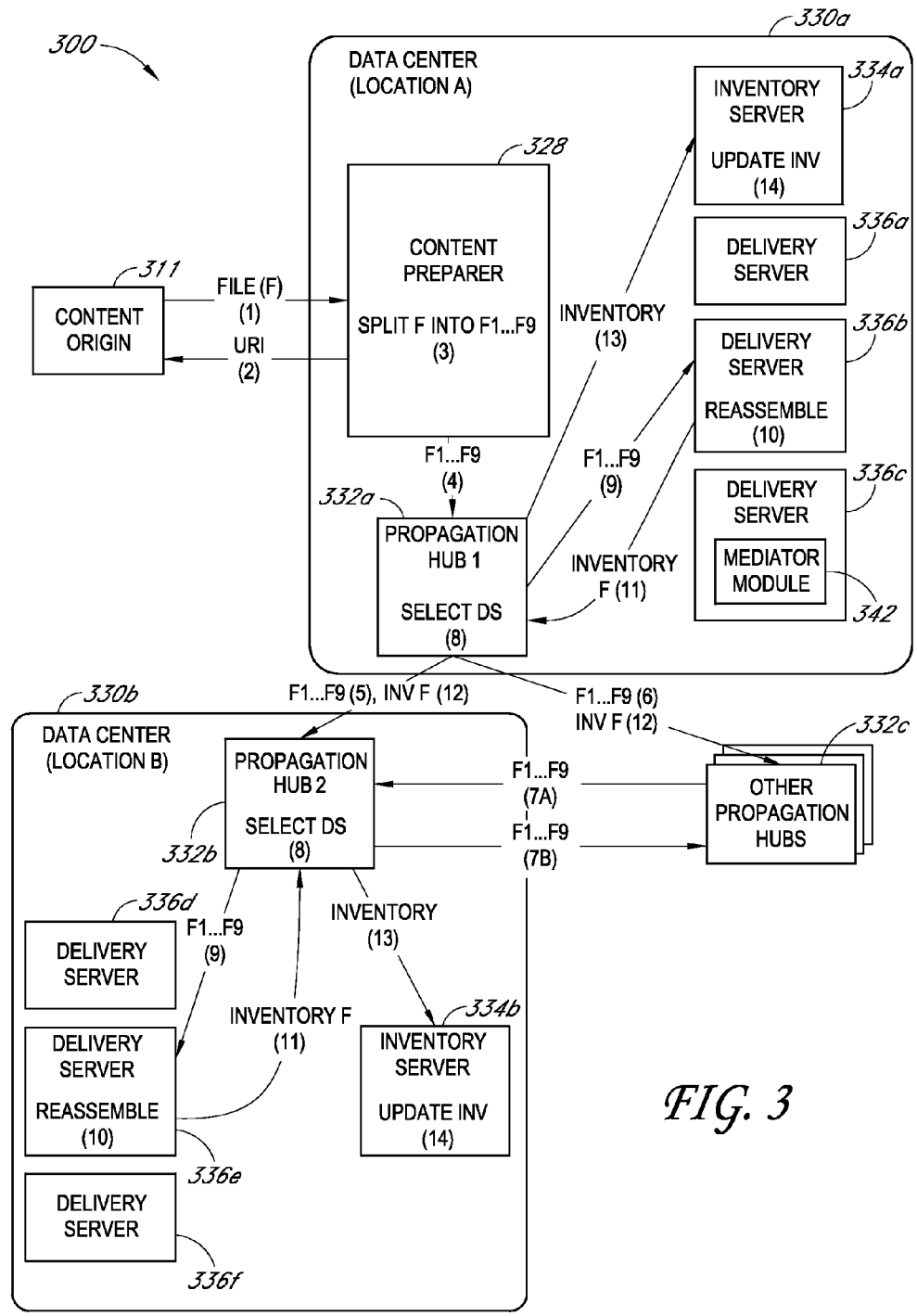
FIG. 3 illustrates an embodiment of a process flow for propagating content through the content delivery network.

FIG. 3 illustrates a more detailed embodiment of a process flow 300 for propagating content files in a CDN. In the process flow 300, two example data centers 330*a*, 330*b* of a CDN are shown. The data centers 330 and associated servers may include all of the features described above. The process flow 300 illustrates an example of parallel file propagation to multiple propagation hubs 332 in a fully-connected mesh.

At state 1, a content file is provided from a content origin 311 to a content preparer 328 at a data center 330*a*. In this example, the file is arbitrarily chosen to be a 90 megabyte (MB) movie file (designated "F" in the FIGURE). In certain embodiments, a software application on the content origin 311 (or on a client device connected to the content origin 311) accesses a network application installed on the content preparer 328 to upload the file. In return, the content preparer 328 provides a URI for the file F at state 2, which the content provider can embed into web pages, a web page generation system, or any other network-enabled application which the content provider desires to deploy.

The content preparer 328 at state 3 splits the file into nine 10-megabyte NNTP message segments, indicated as "F1" through "F9" in the FIGURE. Any number of pieces may be used for a file; thus, nine pieces is merely illustrative. The content preparer 328 can package each message segment with meta-data about the total file F and the message segment. In addition, the content preparer 328 may generate extra messages containing checksums, parity calculations, or other integrity information for the file F. In addition, the content preparer 328 may generate extra messages containing digital rights management restrictions on the file F. At state 4, the content preparer 328 in certain embodiments begins offering the file segments to the nearest propagation hub 332a, via NNTP. The content preparer 328 may have been configured to use this propagation hub 332a for this content provider, or the content preparer 328 may have selected the propagation hub 332a randomly or according to performance metrics.

Once the propagation hub 332a begins receiving NNTP messages containing the file parts F1-F9, it begins offering at states 5 and 6 these messages to other propagation hubs 332b, 332c, e.g., according to NNTP's Flood Fill algorithm. Depending on the network load and on the network segments interconnecting the propagation hubs 332, the propagation hub 332b may receive some segments at state 7A from a propagation hub 332c before it receives them from the propagation hub 332a. Likewise, the propagation hub 332c may receive some segments from the propagation hub 332b (state 7B) before it receives them from the propagation hub 332a.

For redundancy, the content preparer 328 may offer file segments F1-F9 to the propagation hub 332b or the propagation hubs 332c directly after offering them to the propagation hub 332a or if a failure is detected. If the path from the propagation hub 332a to the propagation hub 332b has roughly the same distance as the path from the propagation hub 332a to the propagation hub 332c, and if the path between the propagation hub 332b and the propagation hub 332c is short, a possible result is that the propagation hub 332b will receive half of its parts from the propagation hub 332a and half from the propagation hub 332c. If the propagation hub 332b has already received a message segment, it can turn down that message segment when it receives it from other propagation hubs 332. Because each propagation hub 332 can receive message segments from multiple propagation hubs 332, in certain embodiments, the propagation hubs 332 may receive the message segments in a highly efficient amount of time.

In addition to offering file segments F1-F9 to other propagation hubs 332, the propagation hub 332a may provide the file segments to one or more of three nearby delivery servers 336a, 336b, and 336c in the depicted embodiment. At state 8, the propagation hub 332a selects the delivery server 336 based at least partly on, for example, propagation instructions packaged in file segments F1-F9, the filename of F, and current network statistics known to the propagation hub 332a, among other things. Upon selecting the delivery server 336, the propagation hub 332a sends the file segments to the delivery server 336 at state 9. In the depicted embodiment, the propagation hub 332a has sent the file segments to the delivery server 336b.

The propagation hub 332a may instead randomly select which delivery server(s) 336 receive the file. For example, the propagation hub 332a could hash the filename of the file F into a number and perform a modulo operation on the number, such as a modulo of the number of servers (e.g., 3 servers in the present example). The propagation hub 332a might then send the file segments F1-F9 to the delivery server having the resulting number. To illustrate, if the filename were hashed into the number 14, 14 mod 3 would equal 2. If one of the delivery servers 336 were logically assigned the number 2, the propagation hub 332a could forward the file to that number 2 delivery server 336.

Similarly, at state 8, the propagation hub 332b can likewise select one or more delivery servers 336 from its local servers 336d, 336e, or 336f, and at state 9 send the file segments F1-F9 to that server 336. In the depicted embodiment, the propagation hub 332a has sent the file segments to the delivery server 336e. The other propagation hubs 332c can proceed in a similar fashion.

Once delivery servers 336b and 336e have received all or substantially all of the parts F1-F9 from propagation hubs 332, each delivery server 336b, 336e can construct at state 10 an inventory change announcement indicating that the file F has been received. Each delivery server 336b, 336e can send this announcement as an NNTP message posted to a characteristic newsgroup or channel through use of the Newsgroups header field.

Each inventory message may further contain one or more URLs which can be used to access the re-assembled file. The delivery server 336b can send this announcement at state 11 to the propagation hub 332a via NNTP. At state 12, the propagation hub 332a can propagate the inventory announcement to other propagation hubs 332 and to the inventory server 334a at state 13. Similar actions may occur between the propagation hub 332b, the delivery server 336e, and the inventory server 334b.

Upon receiving the inventory announcement, at state 14 the inventory server 334a and the other inventory servers 334 may update their mappings of URIs to delivery servers 336 and thereby become ready to service user requests for the file F. At this point, the file F can be considered provisioned for delivery. The content provider can now use the URI for F in its web pages or other services.

Each delivery server 336 may include a mediator module 340 that keeps track of content demand. For ease of illustration, the mediator module 340 is depicted on only one of the delivery servers 336c. As the demand for a file exceeds a particular bandwidth threshold, or as a particular server exceeds a bandwidth threshold, the mediator module 340 can notify a propagation hub 332. For instance, the mediator module 340 can send an NNTP message requesting the propagation hub 332 to provision one or more files on additional delivery servers 336.

In response, the propagation hub 332 may provision the files to additional servers 336. Conversely, the mediator module 340 may determine that demand is below a threshold, and delete one or more files from the delivery server 336. The mediator module 340 can send a message to a propagation hub 332, requesting the propagation hub 332 to propagate a delete command for at least some of the files on other delivery servers 332.

Figure 4:
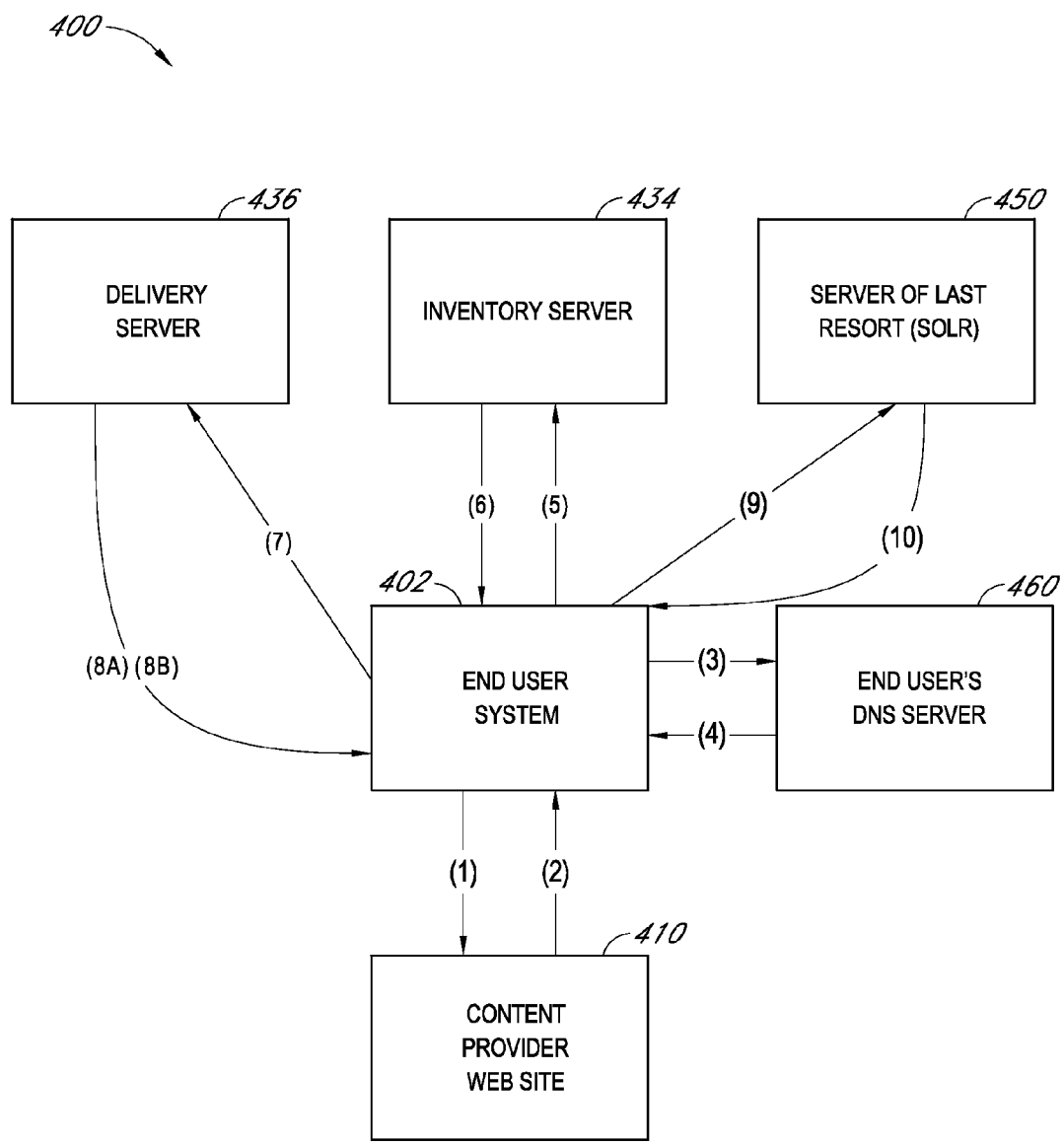
FIGS. 4 and 5 illustrate additional embodiments of process flows for providing content from the content delivery network to an end user.

FIG. 4 illustrates an embodiment of a process flow 400 for providing content to end users via download. The process flow 400 includes an end user's system 402, a content provider web site 410, a delivery server 436, and an inventory server 434, each of which may have all of the features described above. In addition, an end user's Domain Name Service (DNS) server 460 and a server of last resort (SOLR) 450 are shown.

The end user's DNS server 460 may be a local DSN server or the like that is provided by the end user's ISP. The end user's DNS server 460 can be the first DNS server contacted by the end user system 402 when the end user system 402 requests a domain name resolution.

The SOLR 450 can include one or more servers that may be specially configured to host all content (or at least a portion thereof) on the CDN. In one embodiment, the SOLR 450 is not normally used for traffic delivery, but is used to attempt to service mis-routed requests or in failure scenarios. In some implementations, the SOLR 450 is a cluster of an inventory server and delivery servers, and may just be a designation of one such cluster which is otherwise in normal use.

In the process flow 400, a file F has been designated for download delivery (e.g., via HTTP) when the content provider uploaded it to the CDN. The content provider has received a URI from the content preparer, and the content provider has published a web page or other network application containing that URI on the content provider web site 410.

At state 1, an end user, using the end user system 402, accesses the content provider's web site 410. The content provider web site 410 provides, at state 2, a web page or other network application containing a URI for the file F. In an embodiment, this URI points to the inventory server 434 of the CDN, rather than to any servers hosted by the content provider.

An example URI might be as follows: http://cdn.net/a4f2i3q1/cds/picture.jpg. The first part of the URI refers to the HTTP protocol (http://). The hostname, cdn.net, can refer to an inventory server 434 of the CDN, or to multiple inventory servers with the same DNS name and IP address hosted in geographically separate locations. In one embodiment, anycast routing may therefore be used to connect the end user system 402 to one of a plurality of inventory servers 434. The remainder of the URI, /a4f2i3q1/cds/picture.jpg, refers to the filename of the file F ("picture.jpg") and a path where it may be found (/a4f2i3q1/cds/). The characters a4f2i3q1 may be generated in a variety of ways. For example, these characters can be a hash of the filename. The path need not be specified in certain embodiments, or the path and/or filename may also be hashed so as to mask the location of the file F. The path and filename may be the same as the path and filename on the content origin of the content provider, so as to reduce the coding burden on the content provider.

At state 3, the end user system 402 traverses this URI by looking up the hostname in the URI with its DNS server 460. At state 4, the end user system 402 receives an IP address of the inventory server 434. The end user system 402 (e.g., browser software on the system 402) connects at state 5 to the inventory server 434. The inventory server 434 replies at state 6 with, for example, an HTTP redirect to a URL containing the IP address of the delivery server 436. The delivery server 436 in certain embodiments is known to the inventory server 434 to host the content based on the inventory announcements described above. This URL may be a modified version of the URI provided by the content provider web site 410. An example URL might be as follows: http://server5.d1.cdn.net/a4f2i3q1/cds/picture.jpg. In this example, the hostname has been modified from cdn.net to a specific hostname for the delivery server 436, server5.d1.cdn.net.

The end user system 402 contacts the delivery server 436 at state 7 and receives the file via HTTP at state 8*a*. In one embodiment, the delivery server 436 is normally able to comply with the end user's request. If for some reason the delivery server 436 is unable to serve the content, for example because of a storage failure, the delivery server 436 may reply at state 8*b* with another HTTP redirect. This redirect can include a URL which refers the end user system 402 to the SOLR 450. The end user system 402 can request the file, at state 9, from the SOLR 450. The SOLR 450 may reply with the file at state 10.

Figure 5:
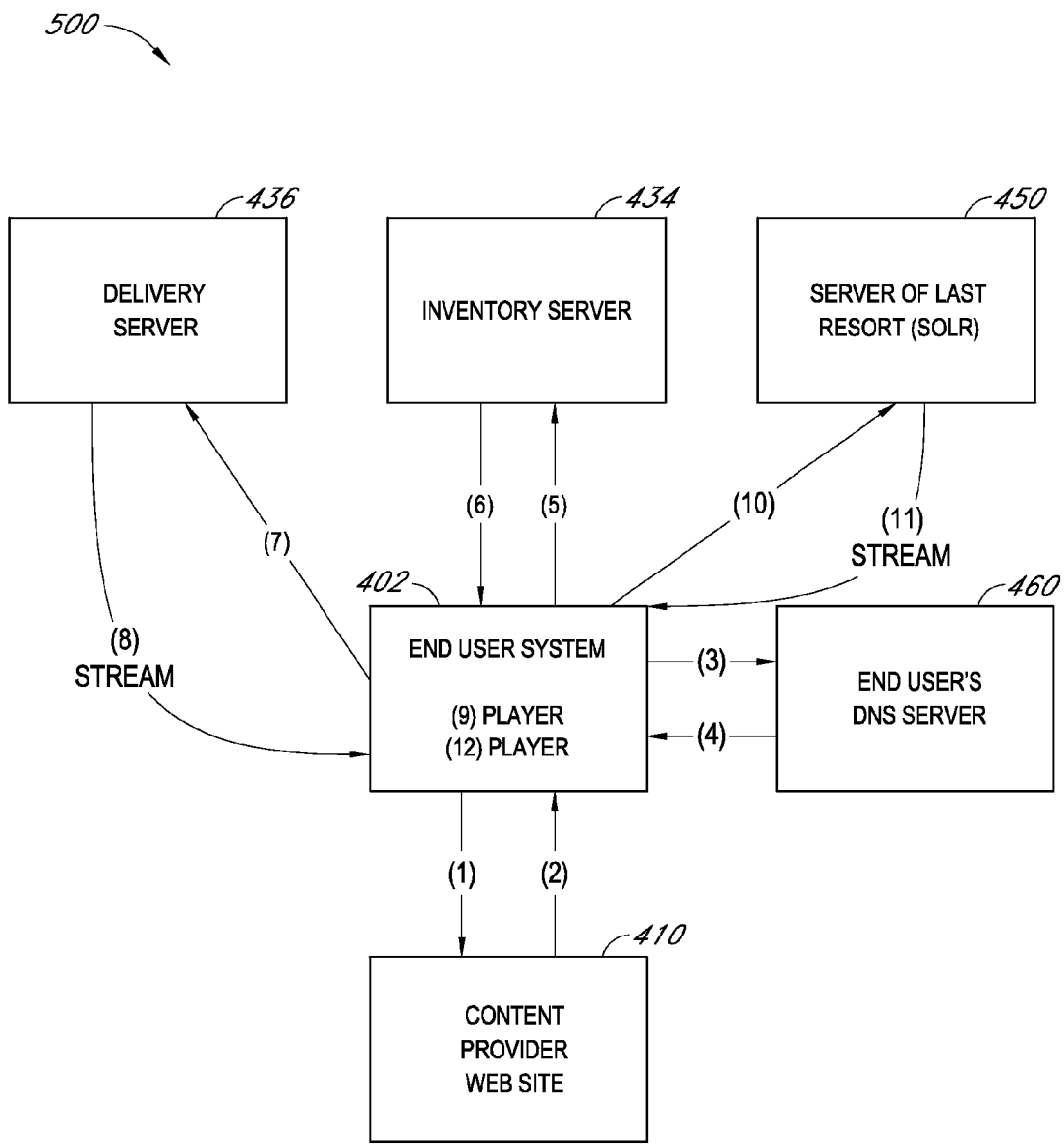

FIG. 5 illustrates an embodiment of a process flow 500 for providing content to end users via streaming. The process flow 500 includes all of the components of the process flow 400, each of which may have all of the functionality described above. In this example, a file F could be designated for streaming delivery by the content provider, through a service such as Windows Media Streaming. The content provider has received a URI from the content preparer, and the content provider has published a web page or other network application containing that URI on the content provider web site 410.

At state 1, the end user system 402 requests the content provider's web site 410 and receives, at state 2, a web page or the like containing a streaming media player and a URI for a playlist which the player wishes to render. Alternatively, the end user system 402 may have previously downloaded the player. When the player activates, the end user system 402 looks up the hostname in the URI at state 3 and receives the IP address of the inventory server 434 at state 4.

The player then connects at state 5 to the inventory server 434 and requests a playlist file. At state 6, the inventory server 434 provides a playlist reply containing a URL for stream rendering of the file F on the delivery server 436, based on inventory information. The inventory server 434 may also provide a URL of the SOLR 450, in case the delivery server 436 is unable to stream the file F.

At state 7, the player contacts the delivery server 436 and receives a media stream at state 8. At state 9, the player renders the stream. If for some reason the download server 436 is unable to serve the stream, the player contacts the SOLR 450 at state 10. The SOLR 450 provides the stream at state 11, and the player renders the stream at state 12.

II. Usage Tracking Features

Figure 6:
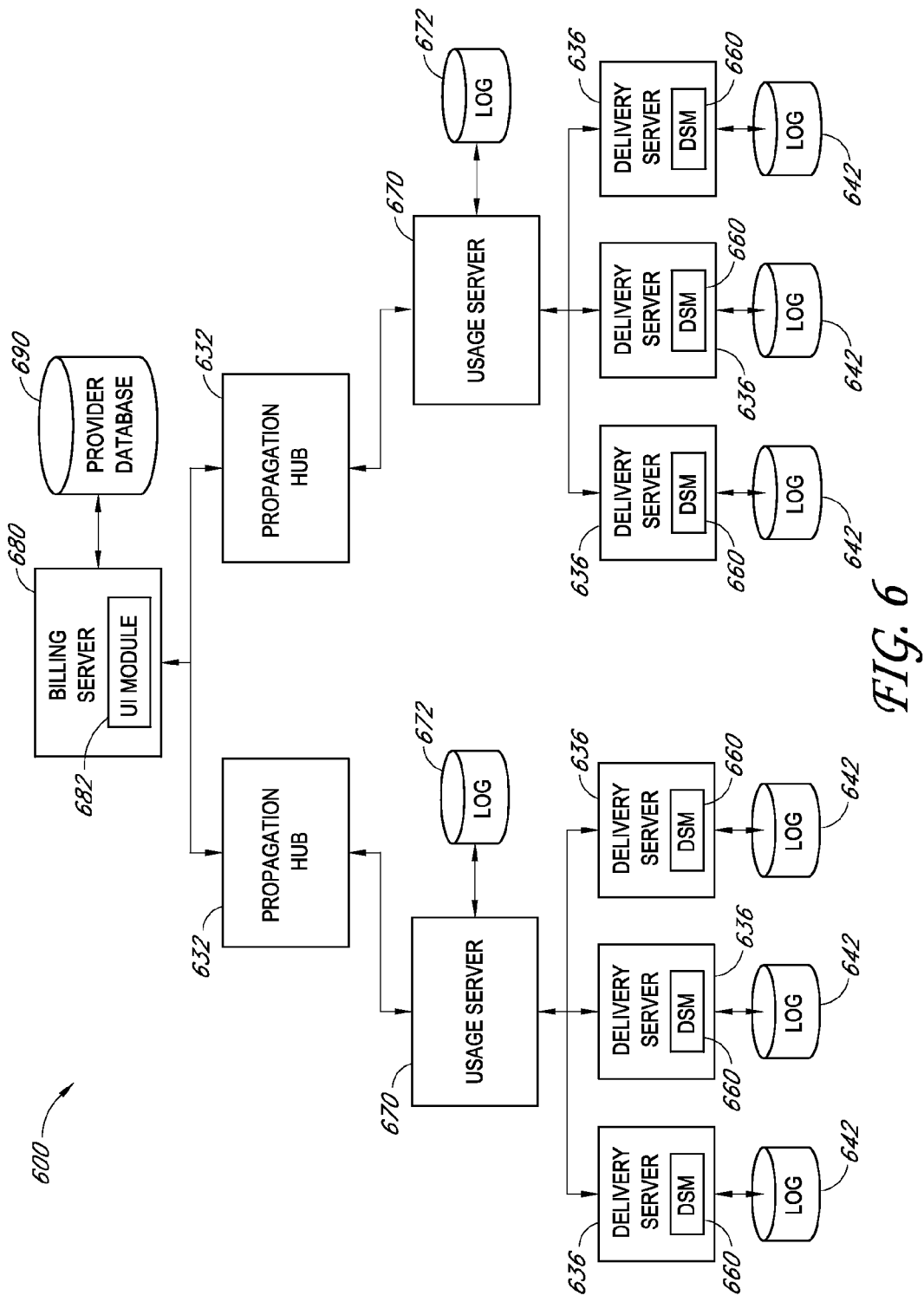
FIG. 6 illustrates an embodiment of a system for tracking content usage in the content delivery network.

FIG. 6 illustrates an embodiment of a usage tracking system 600 for processing content usage in a CDN. The usage tracking system 600 includes delivery servers 636 and propagation hubs 632, which may have all of the functionality described above. In addition, the usage tracking system 600 includes usage servers 670 and a billing server 608, which are described below. Advantageously, in certain embodiments, some or all nodes or servers of the usage tracking system 600 batch or cross-tabulate content delivery or usage data prior to sending delivery data to other nodes. Thus, the usage tracking system 600 may be able to track delivery data more efficiently and faster than other CDNs. As a result, content providers may be provided with more recent usage data, enabling them to more accurately gauge changes in the popularity of content items.

In certain embodiments, the delivery servers 636 can produce delivery or usage data that includes log events for each content delivery attempt to end user systems (not shown). Each log event in the delivery data can include data corresponding to a number of delivery or usage attributes, such as the amount of data successfully transferred, timestamps of the beginning and end of user sessions, IP addresses of end-users, demographic information for end users in the form of HTTP cookies and headers, end-user client application names and versions, combinations of the same, and the like. For streaming protocols, the log events may also include stream start and stop events.

Each delivery server 636 may store the log events of the delivery data in volatile storage (e.g., memory). In addition, each delivery server 636 may store the log events persistently in a log data repository 642, in case network failures or other problems prevent the delivery servers 636 from transmitting the log events to other servers. For instance, the delivery servers 636 may store log events persistently in response to determining that a connection cannot be established with a usage server 670.

Each delivery server 636 may include a delivery server manager (DSM) 660, which can include one or more software components for managing log events on the delivery server 636. The DSM 660 can obtain the log events from memory or from the log data repository 642.

In certain embodiments, the DSM 660 packages, combines, aggregates, or otherwise batches delivery data into log messages for transmission to one of the usage servers 670. For example, the DSM 660 can cross-tabulate the delivery data to condense or summarize the data. The DSM 660 cross-tabulates the data based on the delivery or usage attributes in certain embodiments. Some delivery attributes for which cross-tabulations can be performed may be directly contained in the log events, such as the IP addresses of the originating requests, the names of the requested files, the IP address of various delivery servers 636, the content items which were downloaded or streamed, an amount of bytes or the like of content items that were successfully delivered, affiliate-based codes for affiliates of the content provider, product based identifiers related to content files, and the like.

Other delivery attributes can be calculated by the DSM 660 through use of lookup tables, such as the geographic regions where the user IP addresses originated or autonomous system numbers which own the IP addresses. Other delivery attributes can be calculated via mathematical operations on the fields in the log events, such as number of attempts, total bytes transferred, session duration, throughput, download or streaming completion percentage, and the like. For example, a completion percentage can be calculated by dividing a number of bytes actually downloaded of a file by the size of the file. In some embodiments, the completion percentage or other delivery attributes can be determined by the usage servers 670 or by the billing server 680 (see below).

As one example, one log event might include data regarding a first content item for which 40 KB was downloaded of a 100 KB file to a user system having a first IP address. A second log event might include data regarding the same content item for which 80 KB was downloaded of the same 100 KB file to a second user system having a second IP address. The DSM 660 might cross-tabulate these log events by combining the download amounts to equal 40 KB+80 KB=120 KB. The DSM 660 might also calculate that the downloads had an average 60% completion rate between the two users. Additionally, the DSM 660 might lookup each IP address in a lookup table and determine that both user systems are in California. The DSM 660 may provide this cross-tabulated usage data in a message to the propagation hub 632, instead of a separate message for each log event. As a result, in certain embodiments, the DSM 660 can reduce the number of log messages sent over the network.

By sending a message having data from multiple log events, as well as at least some accumulated data, in certain embodiments the DSM 660 can reduce a volume and/or size of log messages sent over the CDN. In one embodiment, the DSM 660 formats and sends the log messages according to NNTP. The DSM 660 can send the log message in response to one or more usage-based triggering actions. These actions might include the DSM 660 determining that enough log event data has been accumulated by volume (e.g., according a number of access requests or bytes delivered) or by financial value, or enough traffic has accumulated per file or IP address or content provider, or that enough time has passed since the last time an NNTP message was sent, or the like. The DSM 660 may also send log messages to the usage server 670 on a configurable periodic basis, such as each minute, each hour, each day, each week, or the like.

If a DSM 660 is unable to contact its designated usage server 670 or a propagation hub 632, the DSM 660 can persistently queue log messages destined for that usage server 670 in the non-volatile data repository 642 for periodic re-attempts. In certain embodiments, this makes the usage tracking system 600 robust against transient communication failures.

Each usage server 670 may run an NNTP application or the like which receives messages containing accumulated log events from one or more DSMs 660. For some configurations, to enhance speed, the usage servers 670 may have an average amount of memory or RAM and a relatively fast, small hard disk. Although not shown, the messages may have been handled intermediately by a propagation hub. Like the delivery servers 636, the usage servers 670 can batch, aggregate, or otherwise cross-tabulate log events received in log messages from delivery servers 636. The usage server 670 can cross-tabulate log events based on values for attributes of the log events, such as originating geographic region or requested file. For example, if one delivery server 636 reports that 1.2 GB of data were downloaded for a given file, and another delivery server 636 reports that 656 MB were downloaded of the same file, the usage server 670 can cross-tabulate these amounts to produce 1.856 GB downloaded for that file.

Some delivery attributes for which cross-tabulations can be performed may be the same as those performed by the delivery servers 636. For example, the delivery attributes can be directly contained in the log events, such as the IP address of the originating requests, the names of the requested files, the IP address of various delivery servers 636, product based identifiers related to content files, and the content items which were downloaded or streamed. Other delivery attributes can be calculated by the usage server 670 through use of lookup tables, such as the geographic region where the user IP address originates or autonomous system numbers which own the IP addresses.

Other delivery attributes can be calculated via mathematical operations on the fields in the log events, such as number of attempts, total bytes transferred, session duration, throughput, download or streaming completion percentage, and the like. The delivery servers 636 and usage servers 670 can be configured to cross-tabulate different types of log events or the same types of log events. In certain embodiments, the delivery servers 636 do not cross-tabulate log events, and only the usage servers 670 and the billing server 680 cross-tabulate events.

When a usage server 670 has accumulated a high enough volume of usage information for a given attribute value, or the financial value of the usage information is high enough, or enough traffic has accumulated per file or IP address or content provider, or enough time has passed since the usage information was received, the usage server 670 can send an NNTP message to a propagation hub 632 giving the cross-tabulated usage. In some cases, the usage server 670 may pass at least some of the original log event NNTP messages on to the propagation hub 632. If the propagation hub 632 is unavailable, then the usage server 670 can store the NNTP message in non-volatile storage for later sending. The arrival of a message from a DSM 660 may thus only be loosely coupled to the sending of a message from the usage server 670 to the propagation hub 632 in certain embodiments.

Each propagation hub 632 can forward the messages it receives from usage servers 670 on to a billing server 680. For each message the billing server 608 receives, the billing server 680 can cross-tabulate the delivery data in the message with data stored in a provider database 690. Like the usage servers 670, the billing server 608 can cross-tabulate the delivery data in the provider database 690 based on attributes. Thus, in addition to providing accurate and recent billing data, the provider database 690 can provide content providers with access to useful statistics about the delivery data, such as completion percentage, geographic distribution of content requests, and so forth. A user interface (UI) module 682 may, for instance, provide content providers with access to the data stored in the provider database 690.

In certain embodiments, the usage tracking system 600 has at least the following advantages over existing log-harvesting CDN architectures. First, the system 600 can be robust against node and network failures. If a DSM 660 or usage server 670 is temporarily or permanently disabled, in certain embodiments only the in-memory usage data is lost. If network connectivity between servers is temporarily disrupted, persistent storage of messages in the interim can cause usage data to be delivered once network connectivity is restored.

Second, the system can be horizontally scalable by adding additional DSM 660 or usage server 670 instances in any role. If the volume of usage information from DSMs 660 that is to be processed in a service provider facility exceeds the capability of a single usage server 670, additional usage servers 670 can be installed and the DSMs 660 can be partitioned amongst the old and new usage servers 670.

Third, the usage tracking system 600 can provide better-than-linear vertical scaling as the volume of usage information increases. If the total delivery rate of delivery servers 636 doubles, the totals in the summary data in the usage messages can double, but the number of messages may not double. Since the processing time can be proportional to the number of messages, the usage tracking system 600 can be robust against both sustained and transient traffic increases.

Figure 7:
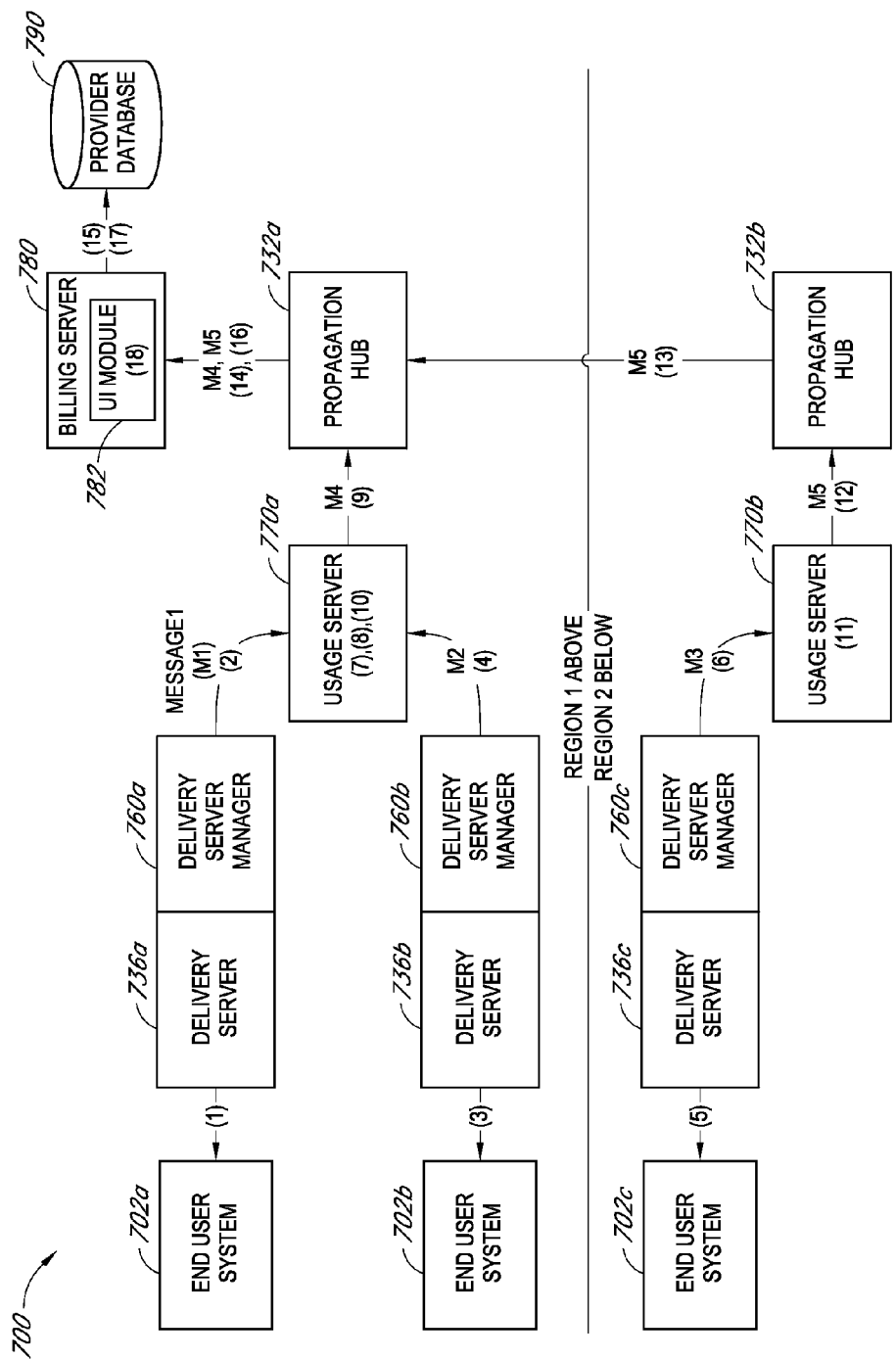
FIG. 7 illustrates an embodiment of a process flow for tracking content usage.

FIG. 7 illustrates an embodiment of a process flow 700 for processing content usage in a CDN. The process flow 700 includes several components described above, such as end user systems 702, delivery servers 736, propagation hubs 732, usage servers 770, and a billing server 780. These components may have all of the functionality described above. Advantageously, in certain embodiments, the process flow 700 enables usage of content in the CDN to be tracked more efficiently and faster than in other CDNs.

In the following example process flow 700, simplified example numerical values are used, illustrating batching of the delivery attributes of bytes downloaded and number of access requests. However, these values are merely illustrative. At state 1, an end user system 702a downloads two 110-kilobyte (KB) files hosted on behalf of a content provider, from a delivery server 736a. The delivery server 736a includes a DSM 706a that sends, at state 2, a raw usage message M1 to a usage server 770a. The message M1 indicates 220 KB of usage and two downloads. The message M1 may contain summary data for the downloads, rather than individual records of the downloads themselves.

At approximately the same time in this example, an end user system 702b downloads a 120 KB file hosted on behalf of the same content provider, from delivery server 736b (state 3). The delivery server 736b includes a DSM 706b that sends, at state 4, a usage message M2 to the usage server 770a. The message M12 indicates 120 KB of usage and one download. The message M2 may contain summary or batched data for the download, rather than an individual record of the download.

Also approximately the same time in this example, an end user system 702c downloads a 210 KB file hosted on behalf of the same content provider, from a delivery server 736c (state 5). The delivery server 736c sends, at state 6, a message M3 to a usage server 770b. The message M3 indicates 210 KB of usage and one download. The message M2 may contain summary or batched data for the download, rather than an individual record of the download.

At state 7, when the usage server 770a receives the message M1, it adds 220 KB of usage and two downloads to an in-memory table (not shown) for the content provider. At state 8, when the usage server 770a receives the message M2, it adds 120 KB of usage and one download to the same in-memory table, giving a total of 340 KB of usage and three downloads. Thus, the usage server 770a cross-tabulates the event data from the two messages M1 and M2.

The usage server 770a sends a message M4, which indicates a total usage of 340 KB and three downloads, to a propagation hub 732a at state 9. When the message M4 has been successfully sent to the propagation hub 732a, or the message has been committed to non-volatile storage for later re-attempt, the usage server 770a may clear the in-memory totals for the content provider at state 10.

When the usage server 770b receives the message M3, it adds 210 KB of usage and one download to in-memory storage tables for the content provider at state 11. At state 12, the usage server 770b sends a message M5 to a propagation hub 732b, indicating a total usage of 210 KB and one download. When the propagation hub 732b receives the message M4, it sends the message on to the propagation hub 732a at state 13.

When the propagation hub 732a receives the messages M4 and M5, the propagation hub 732a sends both messages on to a billing server 780 at states 14 and 16. When the billing server 780 receives the message M4, it cross-tabulates data in the messages by incrementing fields in a provider database 790 at state 15 to reflect an additional 340 KB of data usage and three more downloads. Similarly, when the billing server 780 receives the message M5, it increments fields in the provider database 790 at state 17 to reflect an additional 210 KB of data usage and one download. A content provider user can access the updated usage data in the provider database via a user interface (UI) module 782 at state 18.

Figure 8:
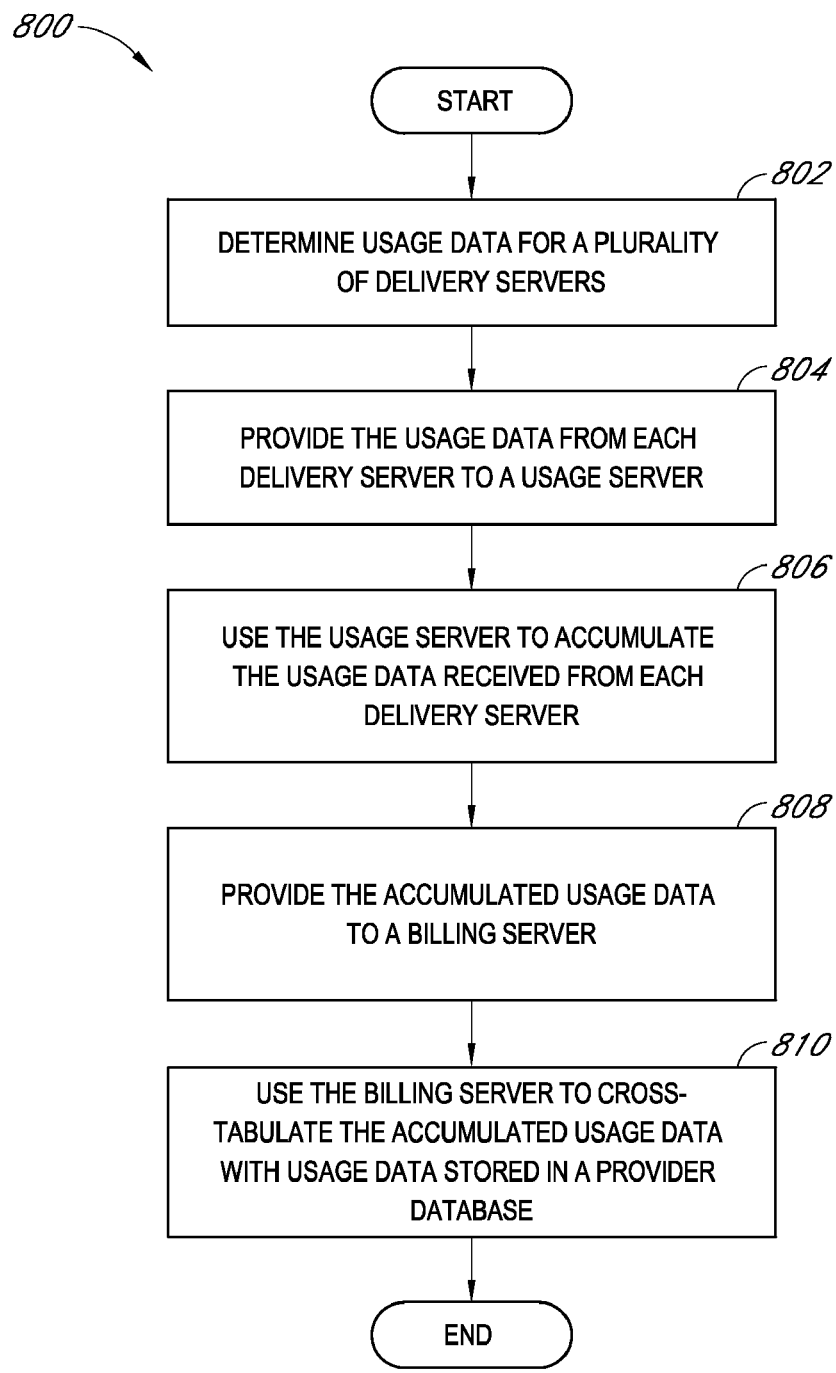
FIG. 8 illustrates an embodiment of a process for tracking content usage.

FIG. 8 illustrates an embodiment of a process 800 for tracking usage in a CDN. The process 800 may be performed by any of the systems described above. In particular, in certain embodiments, the process 800 is performed by the usage tracking system 600.

At block 802, usage data for a plurality of delivery servers is determined. The usage data may include log events corresponding to end user accesses of content stored on the delivery servers. This block may be performed by a DMS installed on each of the delivery servers. At block 804, the usage data is provided from each delivery server to a usage server. This block may also be performed by the DMS. In an embodiment, the DMS does not send each log event individually to the usage server but instead packages a set of log events in a single message for transmission to the usage server. Alternatively, the DMS may send at least some individual log events to the usage server. This may occur, for example, if a single log event has occurred during an entire period in which the DMS customarily sends log messages.

At block 806, the usage server may be used to accumulate the usage data received from each delivery server. This block may include cross-tabulating usage statistics for a variety of attributes of each log event described in the log messages. After a period of time, the accumulated usage data is provided to a billing server at block 808. The usage data may be provided at periodic, scheduled times, in response to a certain volume of data being accumulated, or the like. The usage data may be provided to the billing server by the usage server, through possibly one or more propagation hubs. At block 810, the billing server may be used to cross-tabulate the accumulated usage data with usage data stored in a provider database.

FIGS. 9 through 12 illustrate example administrative displays 900 through 1200 for viewing usage data related to the CDN. The administrative displays 900 through 1200 may be created, for example, by the UI module 682 or 782 described above. Advantageously, in certain embodiments, the administrative displays 900 through 1200 enable content providers to see accurate, recent usage data. The displays shown are merely illustrative, and many other configurations of the displays may be provided in other embodiments.

Figure 9:
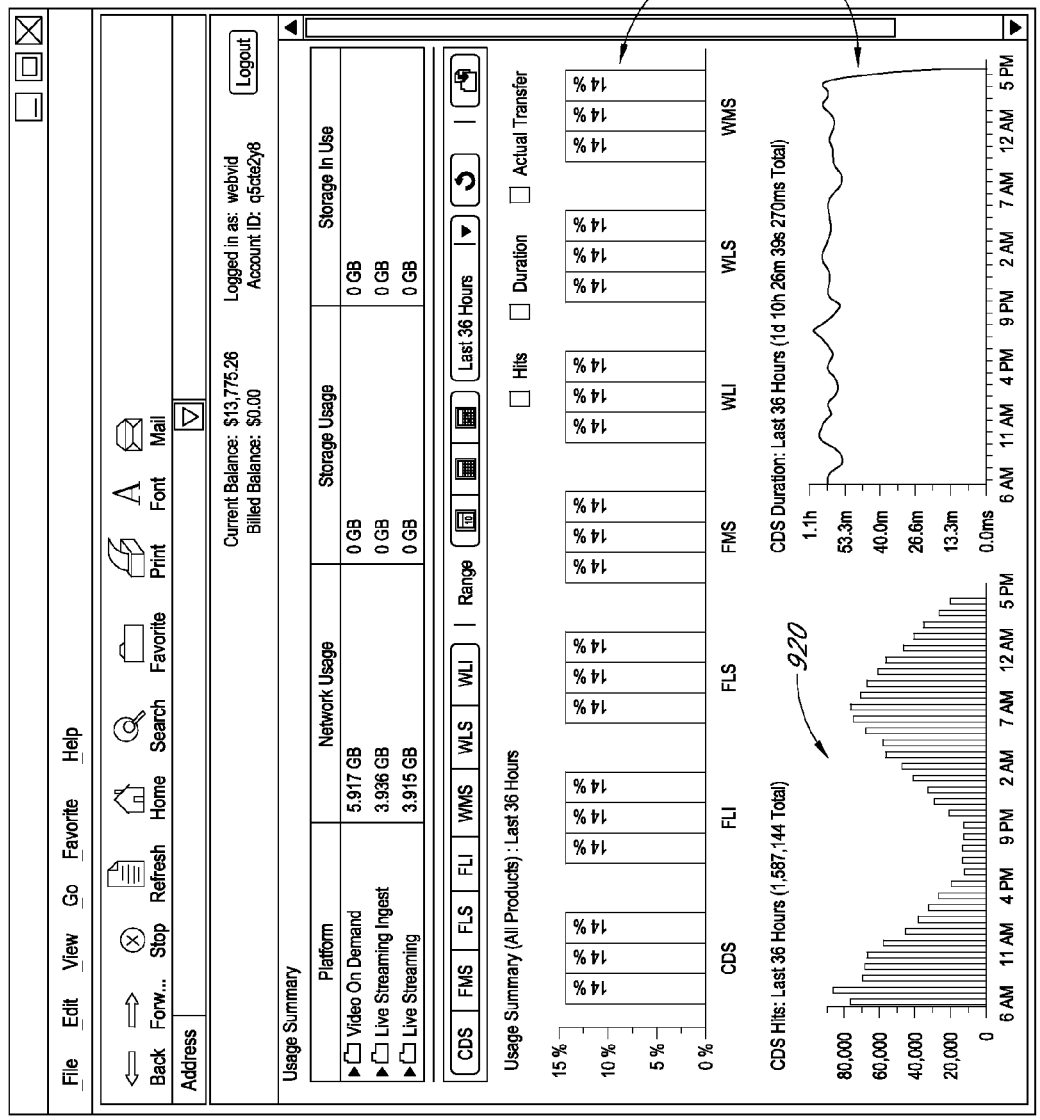

Referring to FIG. 9, the display 900 provides an overview of a content provider's usage statistics. A usage summary 910 displays hits, durations, and transfers for a variety of download and streaming technologies. Some example technologies displayed include CDS (HTTP downloads), FMS (Flash Media), FLS (Flash Live Streaming), WMS (Windows Media), and WLS (Windows Live Streaming). Also shown are download hit counts 920 over the previous 24-hour period and download durations 930 over the same period.

Advantageously, this up-to-date, recent usage data is made possible in certain embodiments by the streamlined usage tracking techniques described above. For example, the transmission of accumulated log events to the billing server, rather than individual log events, can result in faster usage data updating than in systems that cross-tabulate all log events in a provider database. Content providers may use this up-to-date data to analyze the popularity of downloads and streams, for example, and adjust the content they provide accordingly.

Figure 10:
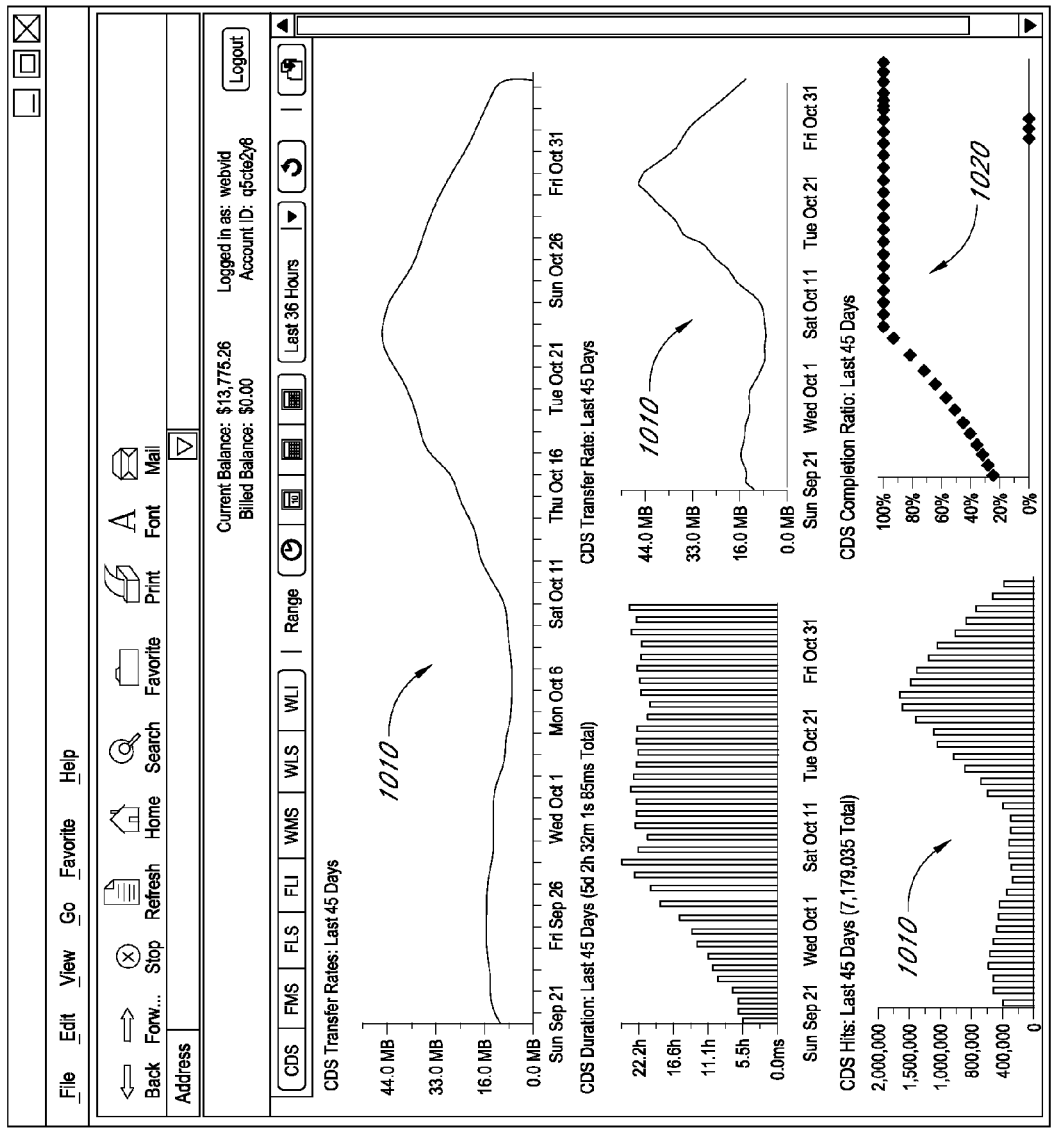

Turning to FIG. 10, various measures 1010 of usage data are shown for longer time periods than in FIG. 9. In addition, aggregate completion statistics 1020 are shown, which indicate to what extent files that users started to access were fully downloaded or streamed. Item-specific completion statistics 1120 are shown in FIG. 11. Content providers may use these statistics 1020 to determine which content items are more popular with users.

Completion statistics 1020, 1120 can be useful for market testing of various items. For instance, a content provider might release two movie trailers online and analyze the completion statistics 1020, 1120 to determine which trailer is being more completely downloaded or streamed. The trailer that is being completely accessed more may be more popular with users. The content provider may then decide to exclusively show the more popular trailer, or adjust the degree to which one trailer is shown. Content providers may also use these techniques with online games, advertisements, and the like. Other statistics shown in the display 1100, such as hits, duration, actual transfers, and so on, may be used in a similar manner.

Figure 12:
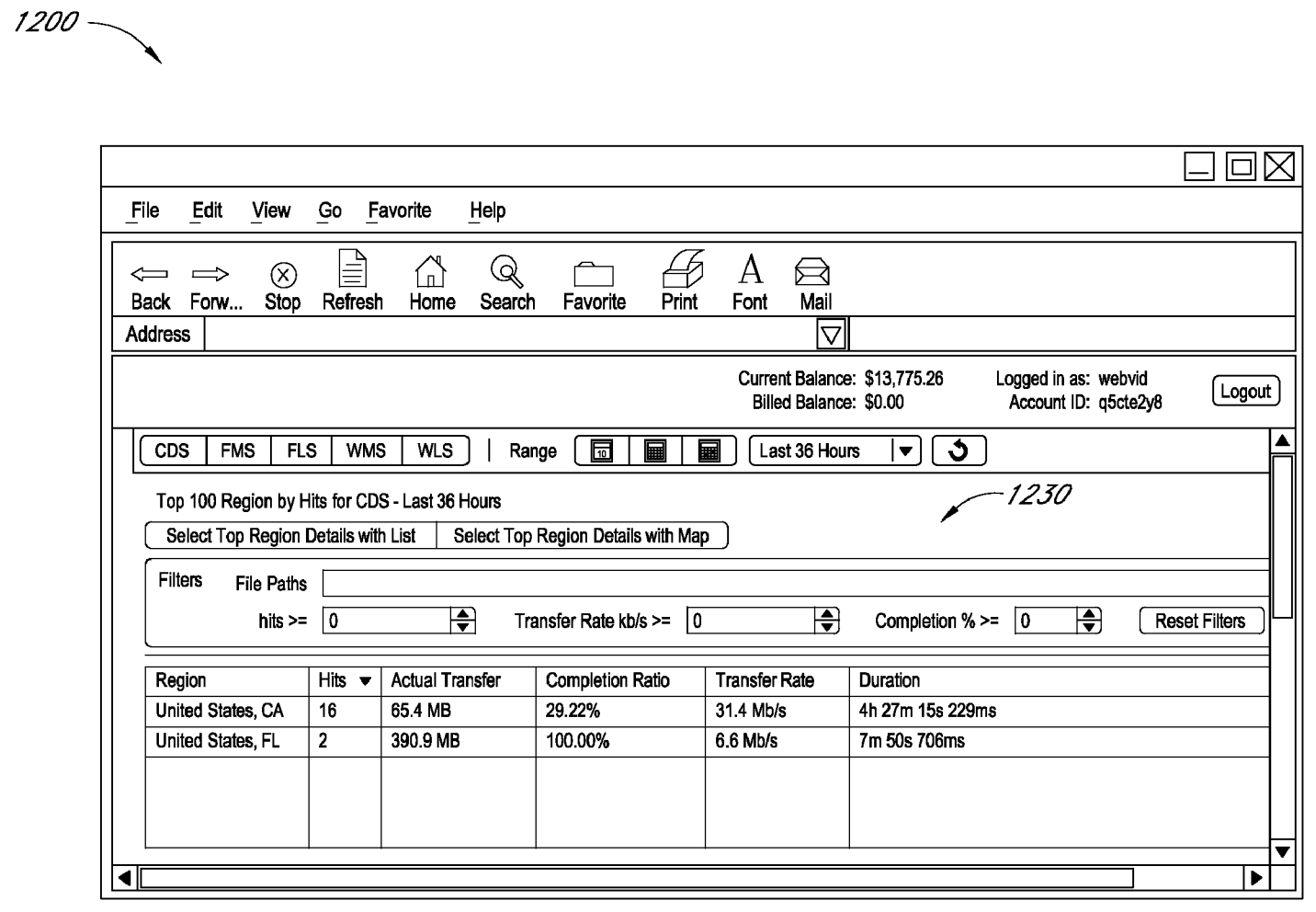

Referring to FIG. 12, the display 1200 includes geographical statistics 1230. The geographical statistics 1230 can show the popularity of content items in different parts of the world. A map (not shown) may also be provided to give a visual depiction of the popularity of content across the world. This information can assist content providers in market research regarding geographical preferences. For instance, content providers can use this data in A-B market testing, where the content provider deploys two advertisements (ad A and ad B) in different geographical regions. The content provider can analyze the geographical statistics 1230 to determine which advertisement is being clicked on more, being viewed completely, and so forth. Advantageously, in certain embodiments, the recency of these statistics 1230 is made possible by the accumulation features of the usage tracking system described above.

Conclusion

The various blocks and modules of the systems described herein can be implemented as software applications, hardware and/or software modules, or components on one or more machines, such as computers, servers, or the like. While the various modules are illustrated separately, they may share some or all of the same underlying logic or code. In addition, each of the processes, components, and algorithms described above may also be embodied in, and fully automated by, modules executed by one or more computers or computer processors. The modules may be stored on any type of computer-readable medium or computer storage device. In addition, in some embodiments, certain processes, components, and algorithms described herein may be implemented monolithically.

The processes and algorithms may also be implemented partially or wholly in application-specific circuitry. The results of the disclosed processes and process states may be stored, persistently or otherwise, in any type of computer storage. In one embodiment, the modules may be configured to execute on one or more processors, including sub-processors. In addition, the modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, combinations of the same, and the like.

The various features and processes described above may be used independently of one another, or may be combined in various ways. All possible combinations and subcombinations are intended to fall within the scope of this disclosure. In addition, certain method or process blocks or states may be omitted in some implementations. The methods and processes described herein are also not limited to any particular sequence, and the blocks, states, or states relating thereto can be performed in other sequences that are appropriate. For example, described blocks, states, or states may be performed in an order other than that specifically disclosed, or multiple blocks, states, or states may be combined in a single block, state, or state.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments of the inventions disclosed herein have been described, these embodiments have been presented by way of example only, and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for providing media owners with media delivery reports showing statistics of each media file delivered, the system comprising:

a plurality of delivery servers in a content delivery network, each of the delivery servers configured to host media files on behalf of a plurality of different media owners and to deliver the media files to end users over the Internet, each of the delivery servers comprising computer hardware programmed to:

log media delivery events in response to media files being delivered to the end users of the content delivery network, each logged media delivery event comprising media delivery event data regarding delivery time, delivery date, file size in bytes, delivered bytes in case of partial delivery, and delivery duration of each media file delivered to the end users over the internet, analyze the media delivery events to generate an event report that summarizes the media delivery event data, the event report including the number of deliveries of any portion of each media file according to the time of day and date, and the total number of bytes of each media file delivered, and provide the event report with the summarized media delivery event data to a usage server instead of providing a separate message for each of the media delivery events, such that the amount of each of the media files delivered is summed to reflect a first cumulative total amount of each media file delivered by the delivery server, thereby reducing a volume of media delivery messages sent over the content delivery network, said providing being performed in response to one or more of the following usage-based triggering actions:

determining that a threshold amount of the media delivery event data has accumulated, determining that a threshold amount of traffic has accumulated per each media file delivered, and determining that a threshold financial value associated with the media delivery event data has accumulated;

the usage server being programmed to:

receive the event reports from each of the delivery servers, summarize and thereby condense the event reports from each of the delivery servers into a combined event report, such that the amount of each media file delivered by the plurality of delivery servers is further summed to reflect a second cumulative total amount of each media file delivered by the plurality of delivery servers, and provide the summarized event report to a billing server instead of providing the separate event reports to the billing server;

the billing server being programmed to:

combine the summarized event report with historical media delivery event data stored in a provider database to produce overall delivery statistics, calculate a delivery completion percentage for each media file by dividing the total amount of bytes of each media file delivered by the size of the respective media file; and output a content user interface for display to each of the content owners, the content user interface displaying the delivery completion percentage for each media file, so that each media owner can determine which of the media files are being completely delivered to the end users as well as the respective average proportions of the media files that are only partially delivered to the end users, thereby enabling the media owners to determine which of the media files are more often viewed in their entirety by the end users and which are only partially viewed by the end users.

2. The system of claim 1, wherein the usage server is also programmed to determine a geographic region of each network address of each of the end users that accessed content and to combine the geographic region information with each summarized event report.

3. The system of claim 1, wherein the media delivery event data comprises data for a plurality of delivery attributes.

4. The system of claim 2, wherein the delivery attributes comprise an amount of one of the media files that was successfully delivered.

5. The system of claim 1, wherein the billing server further comprises a user interface module operative to output at least a portion of the overall media delivery statistics for display.

6. The system of claim 1, wherein the usage server is further configured to summarize and thereby condense the event reports by determining a geographic region corresponding to each network address of an end user system that accessed one of the media files.

7. The system of claim 1, wherein each of the delivery servers is further configured to persistently store the media event delivery data on the delivery server.

8. The system of claim 7, wherein said storing is performed in response to determining that a connection with the usage server cannot be established.

9. The system of claim 1, wherein as network traffic increases in the content delivery network, the volume of the summarized media event delivery data increases at a slower rate than a rate of increase in the network traffic.

* * * * *